(12) United States Patent
Shimizu et al.

(10) Patent No.: US 12,416,197 B2
(45) Date of Patent: Sep. 16, 2025

(54) METHOD FOR MANUFACTURING GLASS PANEL UNIT

(71) Applicant: PANASONIC INTELLECTUAL PROPERTY MANAGEMENT CO., LTD., Osaka (JP)

(72) Inventors: Takeshi Shimizu, Osaka (JP); Masataka Nonaka, Osaka (JP); Haruhiko Ishikawa, Osaka (JP); Eiichi Uriu, Osaka (JP); Kazuya Hasegawa, Osaka (JP); Tasuku Ishibashi, Ishikawa (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 865 days.

(21) Appl. No.: 17/254,624

(22) PCT Filed: May 23, 2019

(86) PCT No.: PCT/JP2019/020555
§ 371 (c)(1),
(2) Date: Dec. 21, 2020

(87) PCT Pub. No.: WO2020/003829
PCT Pub. Date: Jan. 2, 2020

(65) Prior Publication Data
US 2021/0123297 A1   Apr. 29, 2021

(30) Foreign Application Priority Data

Jun. 26, 2018   (JP) ................................ 2018-121338

(51) Int. Cl.
*E06B 3/673*   (2006.01)
*C03C 27/06*   (2006.01)
(Continued)

(52) U.S. Cl.
CPC ............ *E06B 3/6736* (2013.01); *C03C 27/06* (2013.01); *E06B 3/6612* (2013.01);
(Continued)

(58) Field of Classification Search
CPC .... E06B 3/6775; E06B 3/6736; E06B 3/6612; E06B 3/66304
See application file for complete search history.

(56) References Cited

U.S. PATENT DOCUMENTS

| 6,984,159 | B1 | 1/2006 | Kado et al. |
| 2004/0157010 | A1 | 8/2004 | Minaai et al. |
| 2015/0068666 | A1 | 3/2015 | Abe et al. |
| 2018/0283087 | A1 | 10/2018 | Abe et al. |

FOREIGN PATENT DOCUMENTS

| JP | H11-311069 A | 11/1999 |
| JP | 2001-064043 A | 3/2001 |

(Continued)

OTHER PUBLICATIONS

CN 104961358, machine translation (Year: 2015).*
(Continued)

*Primary Examiner* — Barbara J Musser
(74) *Attorney, Agent, or Firm* — Rimon P.C.

(57) ABSTRACT

A method for manufacturing a glass panel unit includes a glue arrangement step, a pillar placement step, an assembly forming step, a bonding step, an evacuation step, and a sealing step. The evacuation step reduces pressure in an internal space by exhausting, with predetermined suction power, a gas from the internal space via a valve and an exhaust port. The valve includes a first valve allowing the gas to flow through a first channel area and a second valve allowing the gas to flow through a second channel area larger than the first channel area. The evacuation step includes a first evacuation step to be performed first and a second evacuation step to be performed next. In the first (Continued)

evacuation step, the first valve is opened and the second valve is closed. In the second evacuation step, the first valve is closed and the second valve is opened.

4 Claims, 13 Drawing Sheets

(51) Int. Cl.
  *E06B 3/66* (2006.01)
  *E06B 3/663* (2006.01)
  *E06B 3/677* (2006.01)
(52) U.S. Cl.
  CPC ...... *E06B 3/66304* (2013.01); *E06B 3/66333* (2013.01); *E06B 3/6775* (2013.01); *E06B 2003/66338* (2013.01)

(56) References Cited

FOREIGN PATENT DOCUMENTS

| | | | |
|---|---|---|---|
| JP | 2001-351525 | A | 12/2001 |
| JP | 2016-029020 | A | 3/2016 |
| JP | 2018-012637 | A | 1/2018 |
| KR | 10-2009-0069736 | A | 7/2009 |

OTHER PUBLICATIONS

Communication pursuant to Rule 114(2) EPC dated Oct. 29, 2021, issued in the corresponding European Patent Application No. 19827448.2.

International Search Report and Written Opinion issued in International Patent Application No. PCT/JP2019/020555, dated Jul. 16, 2019; with partial English translation.

\* cited by examiner

METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2019/020555, filed on May 23, 2019, which in turn claims the benefit of Japanese Application No. 2018-121338, filed on Jun. 26, 2018, the entire disclosures of which Applications are incorporated by reference herein.

TECHNICAL FIELD

The present invention generally relates to a method for manufacturing a glass panel unit, and more particularly relates to a method for manufacturing a glass panel unit including exhausting a gas from an internal space of an assembly including a first panel, a second panel, a hot glue, and pillars.

BACKGROUND ART

Patent Literature 1 discloses a multi-pane glazing unit. The multi-pane glazing unit of Patent Literature 1 includes: a first panel; a second panel arranged to face the first panel; and a sealant that hermetically bonds the first and second panels together. The multi-pane glazing unit further includes a plurality of spacers arranged in an internal space, which is sealed by the first panel, the second panel, and the sealant to be an evacuated space, to conic into contact with the first and second panels.

To manufacture the known multi-pane glazing unit, the sealant and the spacers are arranged on either the first panel or the second panel so that the first and second panels are hermetically bonded together with the sealant, This increases the chances of the spacers arranged on the first panel or the second panel being displaced when a gas is exhausted from the internal space.

CITATION LIST

Patent Literature

Patent Literature 1: JP H11-311069 A

SUMMARY OF INVENTION

It is therefore an object of the present invention to provide a method for manufacturing a glass panel unit which reduces the chances of the pillars arranged on the first panel or the second parcel being displaced when the gas is exhausted from the internal space.

A method for manufacturing a glass panel unit according to an embodiment of the present disclosure includes a glue arrangement step, a pillar placement step, an assembly forming step, a bonding step, an evacuation step, and a sealing step.

The glue arrangement step includes arranging a hot glue on either a first panel including a first glass pane or a second panel including a second glass pane.

The pillar placement step includes placing pillars on either the first panel or the second panel.

The assembly forming step includes forming an assembly including the first panel, the second panel, the hot glue, and the pillars and having an exhaust port provided through at least one of the first panel, the second panel, or the hot glue by arranging the second panel such that the second panel faces the first panel.

The bonding step includes heating the assembly to melt the hot glue, bonding the first panel and the second panel together with the hot glue thus melted, and thereby forming an internal space surrounded, except the exhaust port, with the first panel, the second panel, and the hot glue melted.

The evacuation step includes reducing pressure in the internal space by evacuation that involves exhausting, with predetermined suction power, a gas from the internal space via parallel channels and the exhaust port.

The sealing step includes creating a hermetically sealed evacuated space by closing the exhaust port and sealing the internal space while maintaining a reduced pressure in the internal space.

The parallel channels include: a plurality of channels that are connected together in parallel; and one or two or more on-off valves provided for one or two or more channels out of the plurality of channels. A total channel area of the parallel channels is changeable according to a combination of opened and closed states of the on-off valves.

The evacuation step includes: a first evacuation step to be performed first; and a second evacuation step to be performed next to the first evacuation step.

The first evacuation step includes allowing the gas to flow while setting the total channel area of the parallel channels at a first total channel area.

The second evacuation step includes allowing the gas to flow while setting the total channel area of the parallel channels at a second total channel area that is larger than the first total channel area.

A method for manufacturing a glass panel unit according to another embodiment of the present disclosure includes a glue arrangement step, a pillar placement step, an assembly forming step, a bonding step, an evacuation step, and a sealing step.

The glue arrangement step includes arranging a hot glue on either a first panel including a first glass pane or a second panel including a second glass pane.

The pillar placement step includes placing pillars on either the first panel or the second panel.

The assembly forming step includes forming an assembly including the first panel, the second panel, the hot glue, and the pillars and having an exhaust port provided through at least one of the first panel, the second panel, or the hot glue by arranging the second panel such that the second panel faces the first panel.

The bonding step includes heating the assembly to melt the hot glue, bonding the first panel and the second panel together with the hot glue thus melted, and thereby forming an internal space surrounded, except the exhaust port, with the first panel, the second panel, and the hot glue melted.

The evacuation step includes reducing pressure in the internal space by evacuation that involves exhausting a gas, using a pump configured to suction the gas with predetermined suction power, from the internal space via a predetermined channel and the exhaust port.

The sealing step includes creating a hermetically sealed evacuated space by closing the exhaust port and sealing the internal space while maintaining a reduced pressure in the internal space.

The predetermined channel includes: an exhaust channel located on a path connecting the pump to the exhaust port and having an exhaust on-off valve; and an air-introducing channel located on a path connecting the pump to the air and having an air-introducing on-off valve.

The evacuation step includes: a first evacuation step to be performed first; and a second evacuation step to be performed next to the first evacuation step.

The first evacuation step includes opening the exhaust on-off valve and opening the air-introducing on-off valve.

The second evacuation step includes opening the exhaust on-off valve and closing the air-introducing on-off valve.

A method for manufacturing a glass panel unit according to still another aspect of the present disclosure includes a glue arrangement step, a pillar placement step, an assembly forming step, a bonding step, an evacuation step, and a sealing step.

The glue arrangement step includes arranging a hot glue on either a first panel including a first glass pane or a second panel including a second glass pane.

The pillar placement step includes placing pillars on either the first panel or the second panel.

The assembly forming step includes forming an assembly including the first panel, the second panel, the hot glue, and the pillars and having an exhaust port provided through at least one of the first panel, the second panel, or the hot glue by arranging the second panel such that the second panel faces the first panel.

The bonding step includes heating the assembly to melt the hot glue, bonding the first panel and the second panel together with the hot glue thus melted, and thereby forming an internal space surrounded, except the exhaust port, with the first panel, the second panel, and the hot glue melted.

The evacuation step includes reducing pressure in the internal space by evacuation that involves exhausting, with predetermined suction power, a gas from the internal space via a valve and the exhaust port.

The sealing step includes creating a hermetically sealed evacuated space by closing the exhaust port and sealing the internal space while maintaining a reduced pressure in the internal space.

The evacuation step includes: a first evacuation step to be performed first; and a second evacuation step to be performed next to the first evacuation step. The first evacuation step and the second evacuation step each include controlling opened and closed states of the valve.

A first ratio of a valve open duration during the first evacuation step to an overall running time of the first evacuation step is smaller than a second ratio of a valve open duration during the second evacuation step to an overall running time of the second evacuation step. The valve open duration is a period of time for which the valve is opened.

DESCRIPTION OF EMBODIMENTS

The first to fourth embodiments to be described below generally relate to a method for manufacturing a glass panel unit, and more particularly relate to a method for manufacturing a glass panel unit including exhausting a gas from an internal space of an assembly including a first panel, a second panel, a hot glue, and pillars.

A method for manufacturing a glass panel unit according to a first embodiment will be described with reference to FIGS. 1-11.

Figure 1:
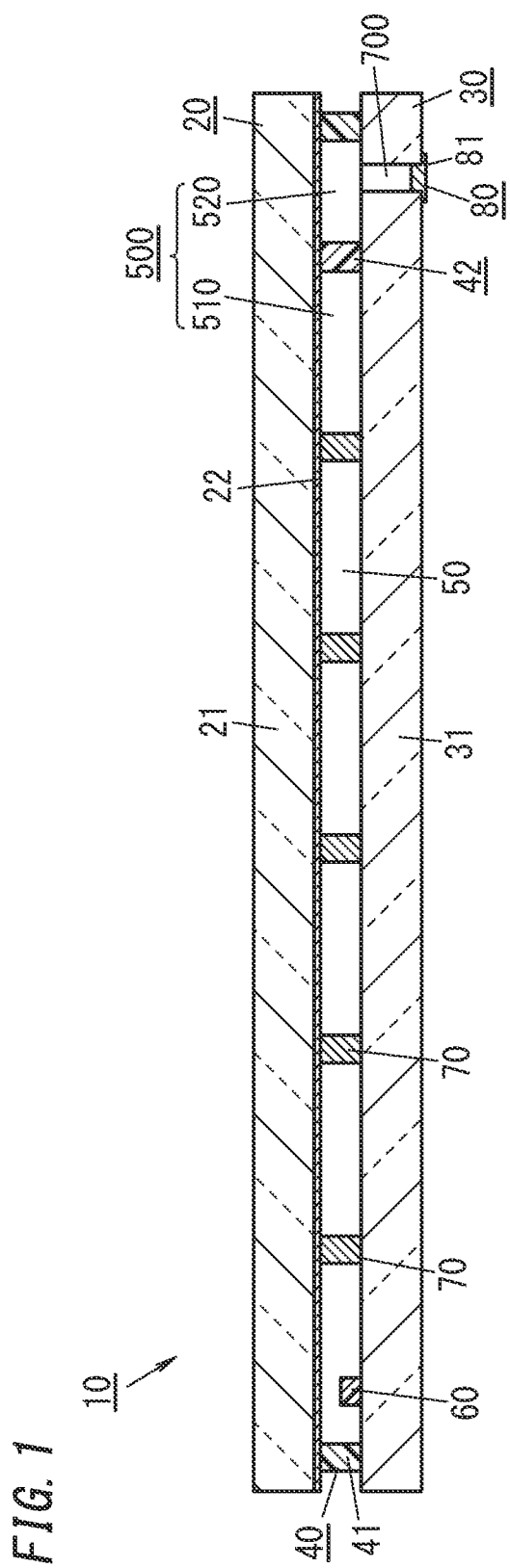
FIG. 1 is a schematic cross-sectional view of a glass panel unit according to a first embodiment.
Figure 2:
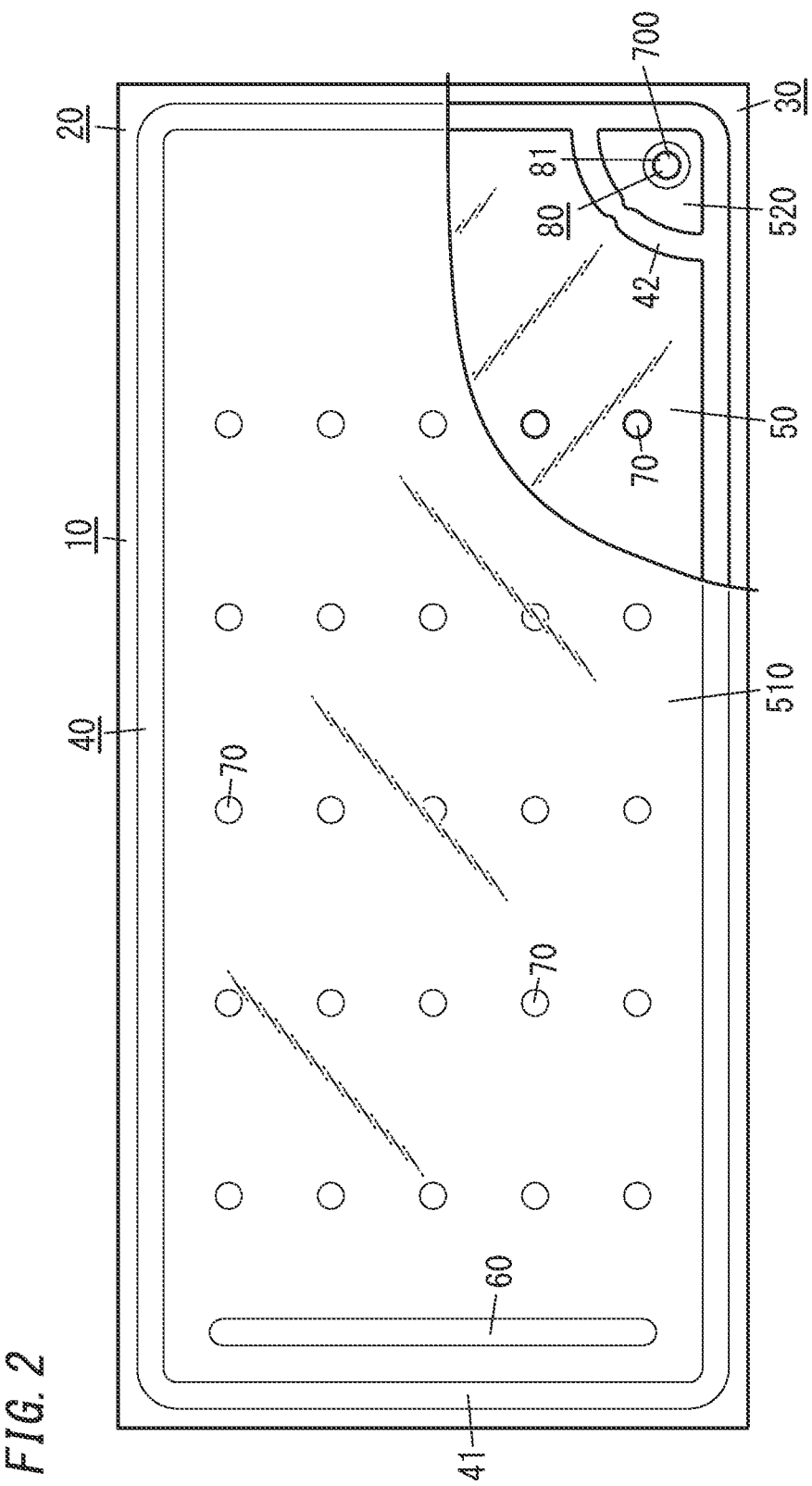
FIG. 2 is a partially cutaway, schematic plan view of the glass panel unit.

FIGS. 1 and 2 illustrate a glass panel unit (which is a glass panel unit as a final product) 10 according to the first embodiment. The glass panel unit 10 according to the first embodiment is a thermal insulation glazing unit. The thermal insulation glazing unit is a type of a multi-pane glazing unit (multi-pane glass panel unit) including at least a pair of glass panels and having an evacuated space (which may be a vacuum space) between the pair of glass panels.

The glass panel unit 10 according to the first embodiment includes a first panel 20, a second panel 30, a seal 40, an evacuated space 50, a gas adsorbent 60, a plurality of pillars 70, and a closing member 80.

Figure 3:
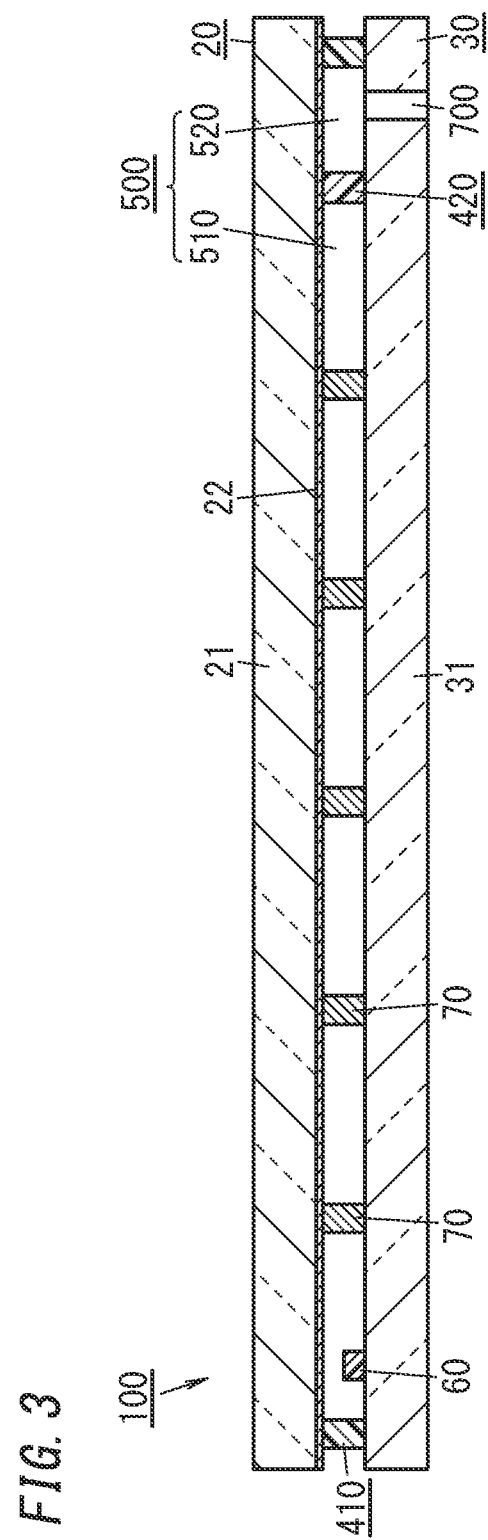
FIG. 3 is a schematic cross-sectional view of an assembly of the glass panel unit.
Figure 4:
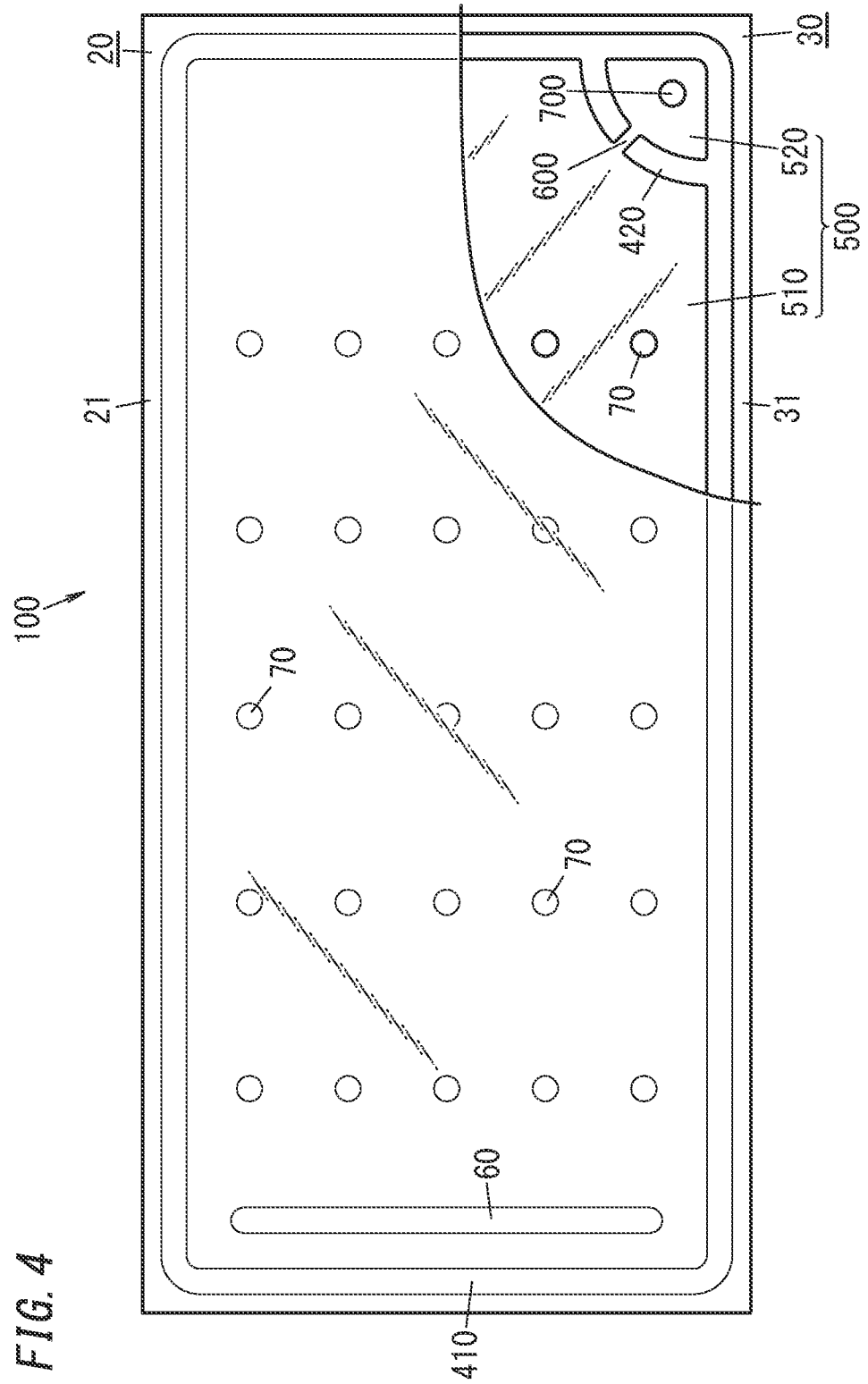
FIG. 4 is a partially cutaway, schematic plan view of the assembly.

The glass panel unit 10 is obtained by processing an assembly 100 as an intermediate product shown in FIGS. 3 and 4.

The assembly 100 includes at least the first panel 20, the second panel 30, a hot glue (including a frame member 410 and a partition 420 to be described later), and the pillars 70, and has an exhaust port 700. Specifically, according to the first embodiment, the assembly 100 includes the first panel 20, the second panel 30, the frame member 410 and partition 420 serving as a hot glue, an internal space 500, an air passage 600, the exhaust port 700, the gas adsorbent 60, and the plurality of pillars 70.

The first panel 20 includes a first glass pane 21 defining the planar shape of the first panel 20 and a coating 22.

The first glass pane 21 is a rectangular flat plate and has a first surface (the lower surface shown in FIG. 3) and a second surface (the upper surface shown in FIG. 3) on both sides in the thickness direction. The first and second surfaces are parallel to each other. The first glass pane 21 with the rectangular shape may have a length of about 1360 mm to about 2350 mm each side, and a thickness of about 1 mm to about 20 mm, for example. However, these numerical values are only examples and should not be construed as limiting. Examples of materials for the first glass pane 21 include soda lime glass, high strain point glass, chemically tempered glass, alkali-free glass, quartz glass, Neoceram, and thermally tempered glass.

The coating 22 is formed on the first surface of the first glass pane 21. In the first embodiment, a so-called "Low-E (low-emissivity)" film is formed as the coating 22 on the first surface of the first glass pane 21. The coating 22 does not have to be a Low-E film but may also be any other film with desired physical properties. Optionally, the first panel 20 may consist of the first glass pane 21. In other words, the first panel 20 includes at least the first glass pane 21. In the first embodiment, the Low-E film is formed by sputtering as the coating 22 on the first surface of the first glass pane 21.

The second panel 30 includes a second glass pane 31 defining the planar shape of the second panel 30. The second glass pane 31 is a rectangular flat plate and has a first surface (the upper surface shown in FIG. 3) and a second surface (the lower surface shown in FIG. 3) on both sides in the thickness direction. The first and second surfaces of the second glass pane 31 are parallel to each other and are flat surfaces.

The second glass pane 31 may have the same planar shape and same planar dimensions as the first glass pane 21. That is to say, the second panel 30 may have the same planar shape as the first panel 20. Also, the second glass pane 31 may be as thick as the first glass pane 21. Examples of materials for the second glass pane 31 include soda lime glass, high strain point glass, chemically tempered glass, alkali-free glass, quartz glass, Neoceram, and thermally tempered glass.

The second panel 30 may consist of the second glass pane 31. That is to say, the second glass pane 31 may be the second panel 30 itself. Optionally, the second panel 30 may have a coating on either surface thereof. The coating is a film with desired physical properties (such as an infrared reflective film). In that case, the second panel 30 is made up of the second glass pane 31 and the coating. In short, the second panel 30 includes at least the second glass pane 31.

The second panel 30 is arranged to face the first panel 20. Specifically, the first panel 20 and the second panel 30 are arranged such that the first surface of the first glass pane 21 and the first surface of the second glass pane 31 are parallel to each other and face each other.

The frame member 410 is arranged between the first panel 20 and the second panel 30 to hermetically bond the first panel 20 and the second panel 30 together. Thus, an internal space 500 is formed which is surrounded with the frame member 410, the first panel 20, and the second panel 30.

The frame member 410 is made of a hot glue (which is a first hot glue with a first softening point). The first hot glue may be a glass frit, for example. The glass frit may be a low-melting glass frit, for example. Examples of the low-melting glass frits include a bismuth-based glass frit, a lead-based glass frit, and a vanadium-based glass frit.

The frame member 410 has a rectangular frame shape. The planar shape of the frame member 410 may be substantially the same as that of the first glass pane 21 and the second glass pane 31. However, the frame member 410 has smaller planar dimensions than the first glass pane 21 and the second glass pane 31. The frame member 410 is formed along the outer periphery of the upper surface of the second panel 30 (i.e., the first surface of the second glass pane 31). That is to say, the frame member 410 is formed to surround almost the entire region on the second panel 30 (i.e., the first surface of the second glass pane 31 almost entirely).

The first panel 20 and the second panel 30 are hermetically bonded together with the frame member 410 by once melting the first hot glue of the frame member 410 at a predetermined temperature (first melting temperature) Tm1 (see FIG. 8) which is equal to or higher than the first softening point.

The partition 420 is arranged in the internal space 500. The partition 420 partitions the internal space 500 into a hermetically sealed space, i.e., a first space 510 which will be hermetically sealed to form an evacuated space 50 when the glass panel unit 10 is completed, and a gas exhausting space, i.e., a second space 520 communicating with the exhaust port 700. The partition 420 is provided closer to a first end (i.e., the right end in FIG. 4) along the length of the second panel 30 (i.e., the rightward/leftward direction in FIG. 4) than to a middle of the length of the second panel 30 such that the first space 510 becomes larger than the second space 520.

The partition 420 is made of a hot glue (i.e., a second hot glue having a second softening point). The second hot glue may be a glass frit, for example. The glass frit may be a low-melting glass frit, for example. Examples of the low-melting glass frits include a bismuth-based glass frit, a lead-based glass frit, and a vanadium-based glass frit. The second hot glue is the same as the first hot glue. The second softening point is equal to the first softening point.

An air passage 600 that allows the first space 510 to communicate with the second space 520 is provided through a part of the partition 420.

The exhaust port 700 is a hole that connects the second space 520 to an external environment. The exhaust port 700 is used to exhaust a gas from the first space 510 through the second space 520 and the air passage 600. The exhaust port 700 is provided through the second panel 30 to connect the second space 520 to the external environment. Specifically, the exhaust port 700 is provided at a corner portion of the second panel 30. In the first embodiment, the exhaust port 700 is provided for the second panel 30. However, this is only an example and should not be construed as limiting. The exhaust port 700 may be provided for the first panel 20, or the second panel 30, or a part of the hot glue forming the frame member 410.

The gas adsorbent 60 is arranged in the first space 510. Specifically, the gas adsorbent 60 has an elongate shape and is arranged at a second end along the length of the second panel 30 (i.e., the left end in FIG. 4) to extend along the width of the second panel 30. That is to say, the gas adsorbent 60 is arranged at an end of the first space 510 (evacuated space 50), thus making the gas adsorbent 60 less conspicuous. In addition, the gas adsorbent 60 is provided at some distance from the partition 420 and the air passage 600. This reduces, when a gas is being exhausted from the first space 510, the chances of the gas adsorbent 60 interfering with the gas exhaustion.

The gas adsorbent 60 is used to adsorb an unnecessary gas (such as a residual gas). The unnecessary gas is emitted from the frame member 410 and the partition 420 when the frame member 410 and the partition 420 are heated, for example.

The gas adsorbent 60 includes a getter. The getter is a material having the property of adsorbing molecules smaller in size than a predetermined one. The getter may be an evaporative getter, for example. The evaporative getter has the property of releasing adsorbed molecules when heated to a predetermined temperature (activation temperature) or more. This allows, even if the adsorption ability of the evaporative getter deteriorates, the evaporative getter to recover its adsorption ability by being heated to the activation temperature or more. The evaporative getter may be a zeolite or an ion-exchanged zeolite (such as a copper-ion-exchanged zeolite).

The gas adsorbent 60 includes a powder of this getter. Specifically, the gas adsorbent 60 may be formed by applying a solution in which a powder of the getter is dispersed. This reduces the size of the gas adsorbent 60, thus allowing the gas adsorbent 60 to be arranged even when the evacuated space 50 is narrow.

The plurality of pillars 70 is used to maintain a predetermined gap between the first panel 20 and the second panel 30. That is to say, the plurality of pillars 70 serves spacers to maintain the gap distance between the first panel 20 and the second panel 30 at a desired value.

The plurality of pillars 70 are placed in the first space 510. Specifically, the plurality of pillars 70 are arranged at the intersections of a rectangular (either square or rectangular) grid. The interval between the plurality of pillars 70 may be at least 2 cm, for example. Note that the dimensions, number, interval, and arrangement pattern of the pillars 70 may be selected appropriately.

The pillars 70 may be made of a transparent material. However, this is only an example and should not be construed as limiting. Alternatively, the pillars 70 may also be made of an opaque material if the dimensions of the pillars 70 are sufficiently small. The material for the pillars 70 is selected to prevent the pillars 70 from being deformed in any of the bonding step, the evacuation step, or the sealing step to be described later. For example, the material for the pillars 70 is selected to have a softening point (softening temperature) higher than the first softening point of the first hot glue and the second softening point of the second hot glue.

The closing member 80 is used to reduce the chances of dust, dirt or any other foreign particles entering the second space 520 through the exhaust port 700. In the first embodiment, the closing member 80 may be a lid 81 provided on the surface of the exhaust port 700 of the first panel 20 or the second panel 30.

Providing such a closing member 80 for the exhaust port 700 reduces the chances of dust, dirt or any other foreign particles entering the second space 520 through the exhaust port 700. This reduces the chances of the dust, dirt or any other foreign particles that have entered either the exhaust port 700 or the second space 520 adversely affecting the appearance of the glass panel unit 10. Optionally, such a closing member 80 may be omitted.

Next, a method for manufacturing the glass panel unit 10 according to the first embodiment will be described with reference to FIGS. 5-11. The glass panel unit manufacturing method according to the first embodiment includes a glue arrangement step, a pillar placement step, an assembly forming step, a bonding step, an evacuation step, and a sealing step. Optionally, the manufacturing method may further include other additional process steps as needed. These manufacturing process steps will be described one by one.

According to the first embodiment, first, a substrate forming step is performed, although not shown in any of the drawings. The substrate forming step is the process step of forming the first panel 20 and the second panel 30. Specifically, the substrate forming step may include, for example, making the first panel 20 and the second panel 30. Optionally, the substrate forming step may include cleaning the first panel 20 and the second panel 30 as needed.

Next, the step of providing the exhaust port 700 is performed, in this process step, the exhaust port 700 is provided through the second panel 30. Alternatively, the exhaust port 700 may be provided through the first panel 20 or may be provided through a hot glue to be arranged in the glue arrangement step to be described later. That is to say, the exhaust port 700 is provided through at least one of the first panel 20, the second panel 30, or the hot glue.

Figure 5:
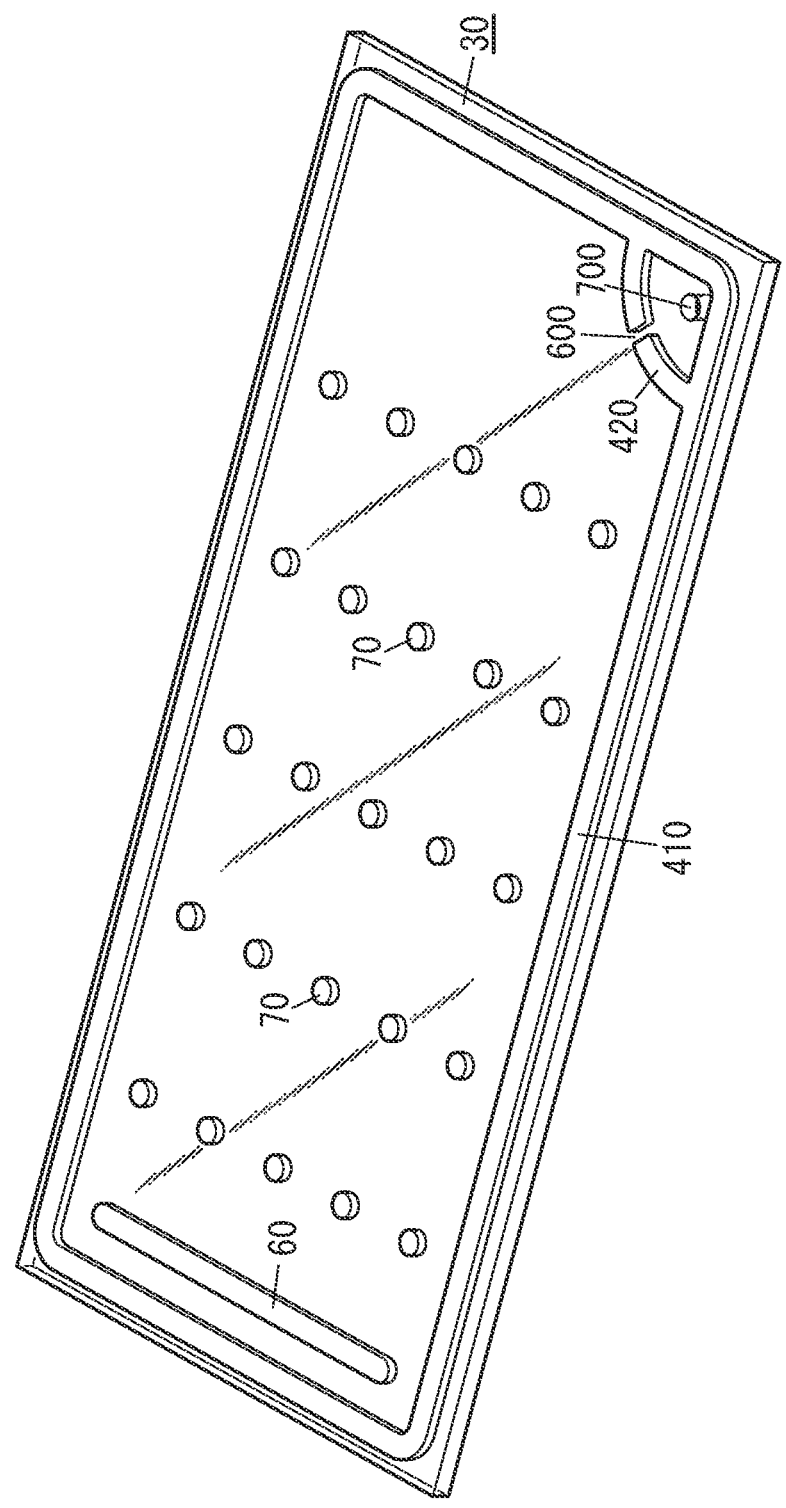
FIG. 5 illustrates a method for manufacturing the glass panel unit.

Next, as shown in FIG. 5, the glue arrangement step is performed. The glue arrangement step is the step of arranging a hot glue on either the first panel 20 or the second panel 30. Specifically, the glue arrangement step includes forming a frame member 410 and a partition 420 on the second panel 30. The glue arrangement step includes applying, with a dispenser, for example, a material for the frame member 410 (i.e., a first hot glue) and a material for the partition 420 (i.e., a second hot glue) onto the second panel 30 (i.e., the first surface of the second glass pane 31). In the first embodiment, in the glue arrangement step, the air passage 600 is formed.

Optionally, the glue arrangement step may include drying and pre-baking the material for the frame member 410 and the material for the partition 420. For example, the second panel 30 on which the material for the frame member 410 and the material for the partition 420 are applied may be heated. If necessary, the first panel 20 may also be heated alone with the second panel 30. That is to say, the first panel 20 and the second panel 30 may be heated under the same condition. Such prebaking may be omitted.

Next, the pillar placement step is performed. The pillar placement step is the step of placing pillars 70 on either the first panel 20 or the second panel 30. Specifically, the pillar placement step includes forming a plurality of pillars 70 in advance and placing, using a chip mounter, for example, the plurality of pillars 70 at predetermined positions on the second panel 30. The plurality of pillars 70 may be formed by photolithographic and etching techniques. In that case, the plurality of pillars 70 may be made of a photocurable material, for example. Alternatively, the plurality of pillars 70 may also be formed by a known thin film forming technique. When measured from the upper surface of the second panel 30, the height of the pillars 70 mounted on the second panel 30 is lower than the height of the hot glue mounted on the second panel 30.

Next, the gas adsorbent forming step is performed. Specifically, the gas adsorbent forming step includes forming a gas adsorbent 60 by applying a solution in which a powder of a getter is dispersed onto a predetermined region on the second panel 30 and drying the solution. Note that the glue arrangement step, the pillar placement step, and the gas adsorbent forming step may be performed in any arbitrary order.

Figure 6:
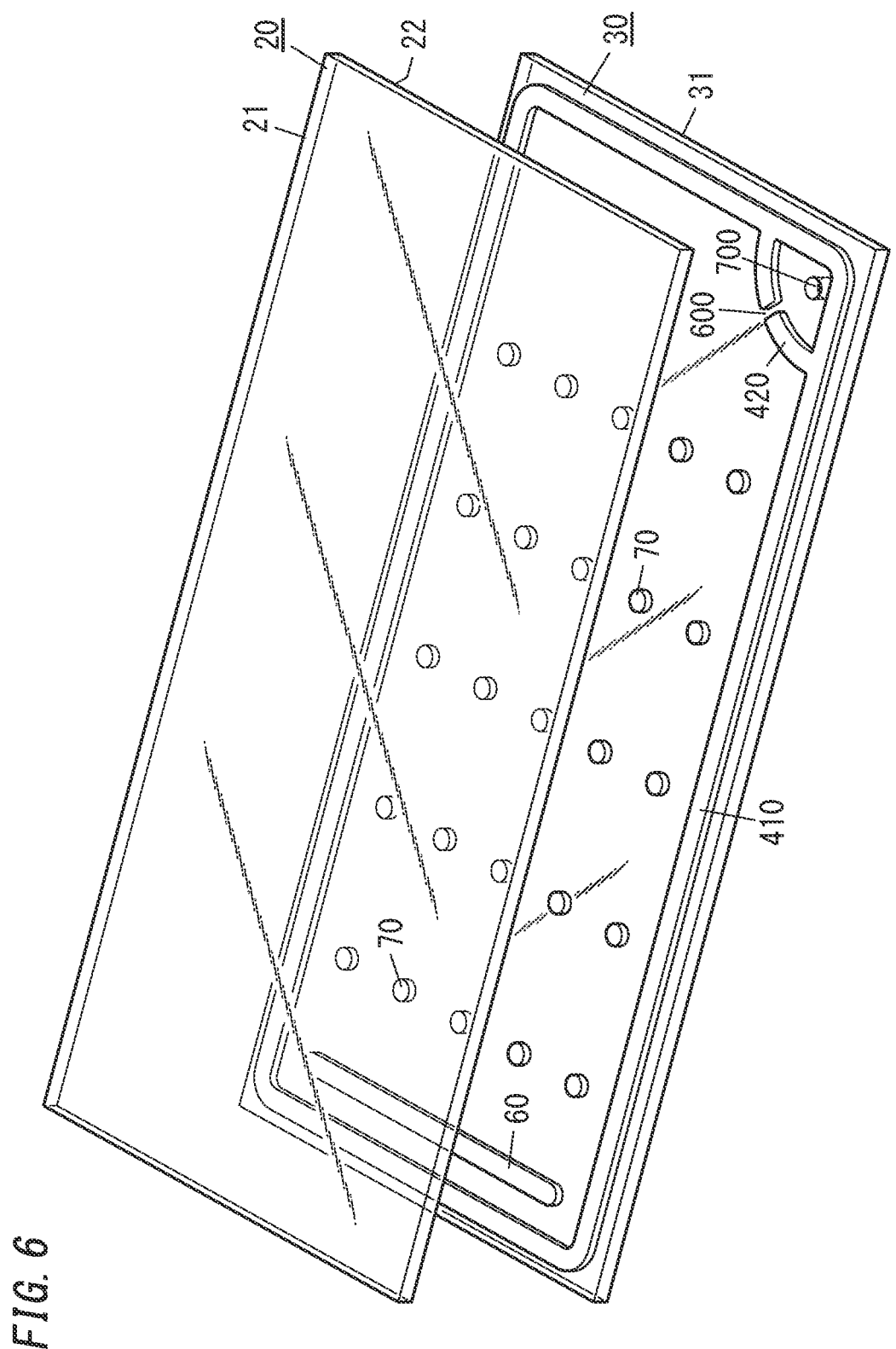
FIG. 6 illustrates the method for manufacturing the glass panel unit.

Next, the assembly forming step is performed. As shown in FIG. 6, the assembly forming step includes forming an assembly 100 (see FIGS. 3 and 4) by arranging the second panel 30 such that the second panel 30 faces the first panel 20.

The first panel 20 and the second panel 30 are arranged such that the first surface of the first glass pane 21 and the first surface of the second glass pane 31 are parallel to each other and face each other and laid one on top of the other. Performing this assembly forming step brings the hot glue into contact with the first panel 20 and the second panel 30, thus forming the assembly 100 shown in FIGS. 3 and 4.

Figure 7:
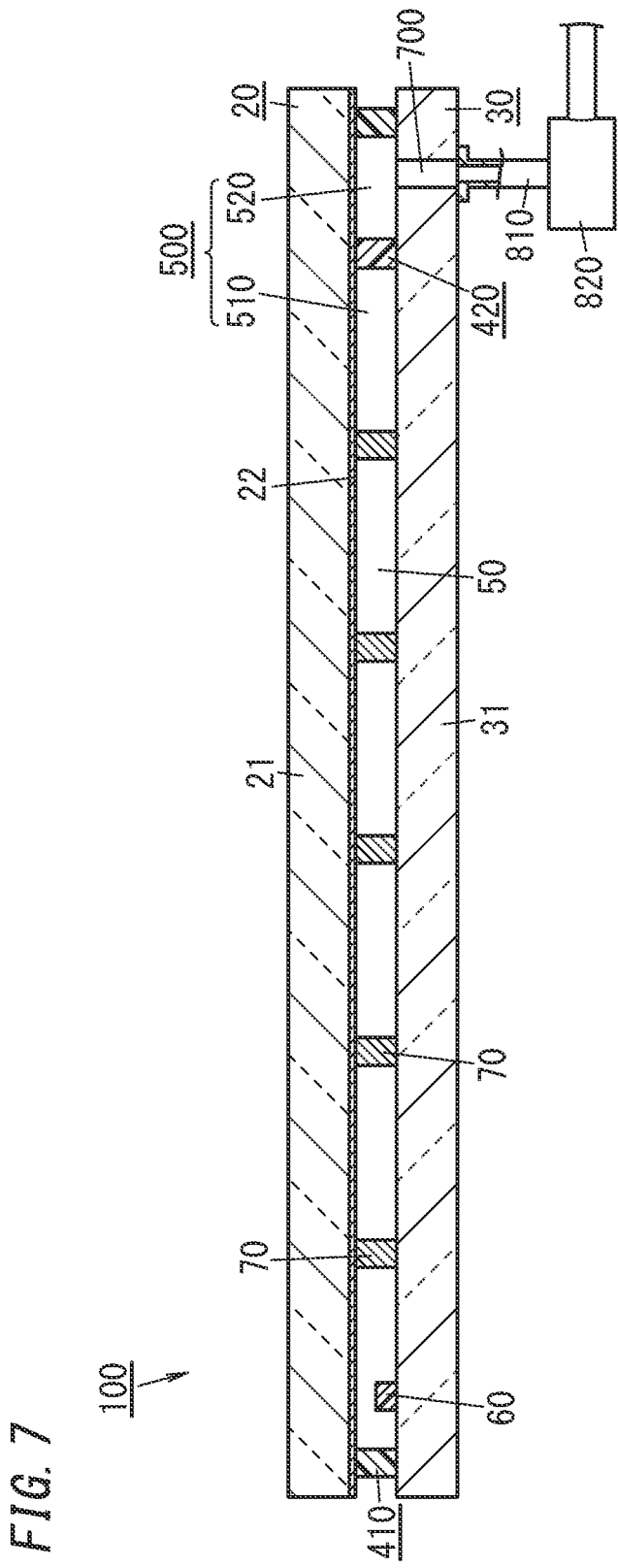
FIG. 7 illustrates the method for manufacturing the glass panel unit.

Next, the assembly mounting step is performed. The assembly mounting step includes mounting the assembly 100 on a supporting stage (not shown) of a melting furnace (not shown) as shown in FIG. 7. In this case, only one supporting stage may be arranged in the melting furnace or a plurality of supporting stages may be arranged as a set in the melting furnace. In the latter case, the respective upper surfaces of the supporting stages are level with each other. The upper surface of the supporting stage(s) is suitably a horizontal plane.

In addition, a vacuum pump is connected to the assembly 100 via an exhaust pipe 810 and a sealing head 820. The exhaust pipe 810 is bonded to the second panel 30 such that the inside of the exhaust pipe 810 communicates with the exhaust port 700, for example. Then, the sealing head 820 is attached to the exhaust pipe 810. In this manner, a suction port of the vacuum pump is connected to the exhaust port 700.

Next, the bonding step (first melting step) is performed. The bonding step includes heating the assembly 100 and melting the hot glue to bond the first panel 20 and the second panel 30 together with the hot glue and thereby form an internal space 500. The internal space 500 is a space surrounded, except the exhaust port 700, with the first panel 20, the second panel 30, and the hot glue melted.

The bonding step and the evacuation step and sealing step following the bonding step are performed with the assembly 100 still loaded in the melting furnace.

The bonding step includes hermetically bonding the first panel 20 and the second panel 30 together by once melting the first hot glue at a predetermined temperature (first melting temperature) Tm1 equal to or higher than a first softening point. The bonding step is divided into a first temperature raising step, a first temperature maintaining step, and a first temperature lowering step according to temperature variations.

Figure 8:
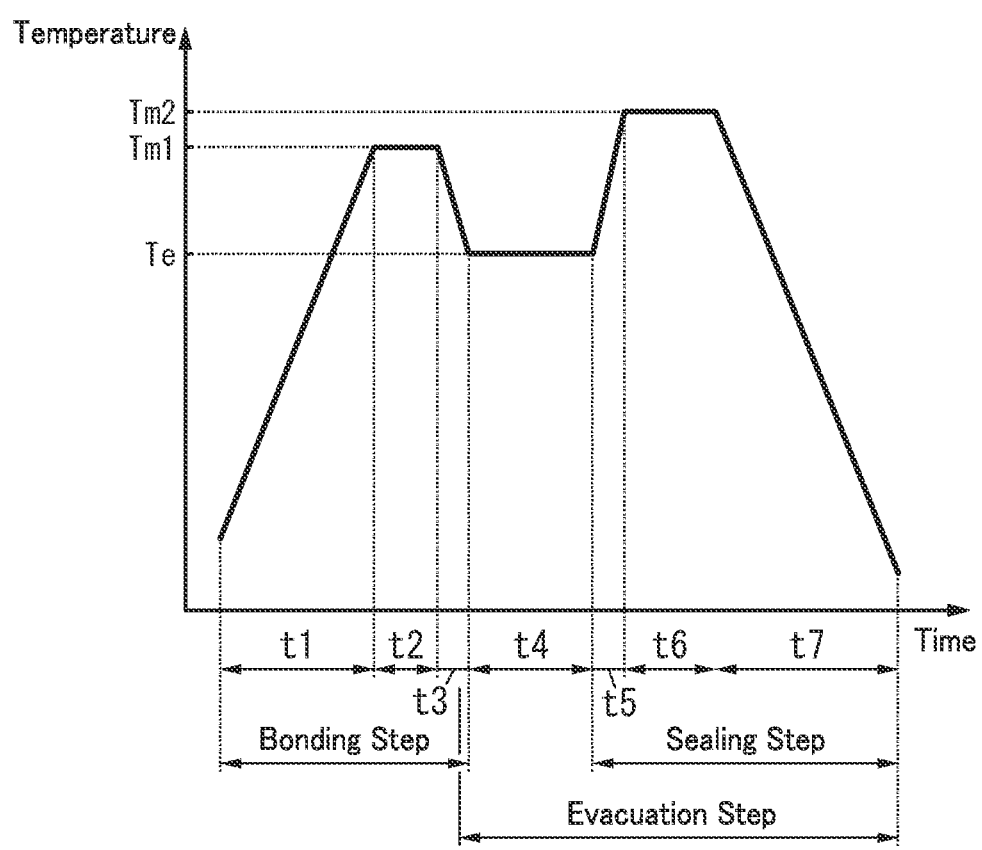
FIG. 8 illustrates the method for manufacturing the glass panel unit.

The first temperature raising step is the process step performed for the time period t1 shown in FIG. 8 and including raising the temperature in the melting furnace from ordinary temperature to the first melting temperature Tm1.

The first temperature maintaining step is the process step performed for the time period t2 shown in FIG. 8 and including maintaining the temperature in the melting furnace at the first melting temperature Tm1.

The first temperature lowering step is the process step performed for the time period t3 shown in FIG. 8 and including lowering the temperature in the melting furnace from the first melting temperature Tm1 to a predetermined temperature (exhaustion temperature) Te to be described later.

The first panel 20 and the second panel are loaded into the melting furnace and are heated at the first melting temperature Tm1 for a predetermined amount of time (first melting time) t2 in the first temperature maintaining step as shown in FIG. 8.

The first melting temperature Tm1 and the first melting time t2 are defined such that the first panel 20 and the second panel 30 are hermetically bonded together with the hot glue of the frame member 410 but that the air passage 600 is not closed by the partition 420. That is to say, the lower limit of the first melting temperature Tm1 is the first softening point, but the upper limit of the first melting temperature Tm1 is set to prevent the air passage 600 from being closed by the partition 420. For example, if the first softening point and the second softening point are 434° C., the first melting temperature Tm1 is set at 440° C. Also, the first melting time t2 may be 10 minutes, for example. Note that in the bonding step, a gas is emitted from the frame member 410 but is adsorbed into the gas adsorbent 60.

In the first temperature lowering step to be performed after the first temperature maintaining step, the first hot glue that has been once melted is going to cure, so are the first panel 20 and the second panel 30.

In this state, the pressure in the internal space 500 has not been reduced yet, and therefore, is as high as the pressure in the external environment. Thus, the first panel 20 and the second panel 30 do not receive force that causes the first and second panels 20, 30 to approach each other under the atmospheric pressure. Therefore, the first panel 20 and the second panel 30 are not close to each other and the pillars 70 mounted on the second panel 30 are out of contact with the first panel 20. This makes the pillars 70 easily displaceable on the second panel 30.

Figure 9A:
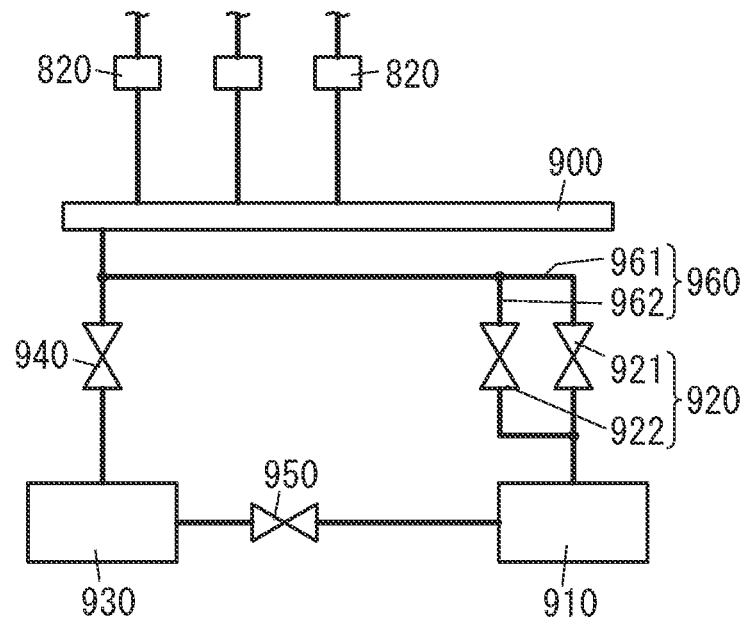
FIG. 9A illustrates an exemplary exhaust system for use in the method for manufacturing the glass panel unit.

Next, the evacuation step is performed. The evacuation step includes reducing pressure in the internal space 500 by evacuation that involves exhausting, with predetermined suction power, a gas from the internal space 500 via parallel channels 960 and the exhaust port 700 as shown in FIG. 9A.

The exhaustion may be carried out using vacuum pumps (910, 930 as will be described later). The vacuum pumps exhaust the gas from the internal space 500 via a manifold 900, the sealing heads 820, the exhaust pipes 810, and the exhaust port 700. The plurality of sealing heads 820 are connected to the manifold 900 via vent pipes.

In the first embodiment, a low-vacuum pump 910 such as a rotary pump and a high-vacuum pump 930 such as a turbo molecular pump may be used as the vacuum pumps. Optionally, the manifold 900 or the vent pipes may be provided with a Penning gauge (for high vacuum) and a Pirani gauge (for low vacuum) as appropriate to measure the pressure.

The parallel channels 960 include a plurality of channels that are connected together in parallel (namely, a first channel 961 and a second channel 962 to be described later) and one or two or more on-off valves (namely, a first valve 921 and a second valve 922 to be described later) provided for one or two or more channels out of the plurality of channels. The total channel area of the parallel channels 960 (i.e., the total of the respective cross-sectional areas of the one or two or more channels, of which the on-off valves are opened) may be changed according to a combination of the opened and closed states of the on-off valves.

Specifically, the parallel channels 960 include: a first channel 961 for selectively allowing the gas to flow, or shutting off the gas, through a channel having a first channel area; and a second channel 962 for selectively allowing the gas to flow, or shutting off the gas, through a channel having a second channel area larger than the first channel area. The first channel 961 and the second channel 962 are provided in parallel.

The low-vacuum pump 910 is connected to the manifold 900 via the parallel channels 960. The first channel 961 has a first valve 921 provided on the way and the second channel 962 has a second valve 922 on the way. The first valve 921 and the second valve 922 together form a low-vacuum valve set 920.

The high-vacuum pump 930 is connected to the manifold 900 via a vent pipe having a high-vacuum valve 940 on the way. Optionally, although not shown, yet another relief valve may be connected to the manifold 900 via another channel.

Also, the low-vacuum pump 910 and the high-vacuum pump 930 are connected together via a vent pipe having an auxiliary valve 950 on the way. Optionally, the low-vacuum pump 910 and the high-vacuum pump 930 do not have to be connected together via the vent pipe.

The first valve 921 may be operated to selectively allow the gas to flow, or shut off the gas, through the first channel 961. The first valve 921 is an on-off valve. The channel area of the first valve 921 opened is the first channel area. The channel area of the rest of the first channel 961 other than the first valve 921 is equal to or greater than the first channel area. The second valve 922 may be operated to selectively allow the gas to flow, or shut off the gas, through the second channel 962. The second valve 922 is an on-off valve. The channel area of the second valve 922 opened is the second channel area. The channel area of the rest of the second channel 962 other than the second valve 922 is equal to or greater than the second channel area. Each of the high-vacuum valve 940 and the auxiliary valve 950 may also be operated to selectively allow the gas to flow, or shut off the gas, through a channel having a predetermined channel area.

The low-vacuum pump 910 has predetermined suction power. Meanwhile, the high-vacuum pump 930 may have different predetermined suction power from the low-vacuum pump 910. However, this is only an example of the present disclosure and should not be construed as limiting. Alternatively, the high-vacuum pump 930 may have the same suction power as the low-vacuum pump 910.

Figure 10:
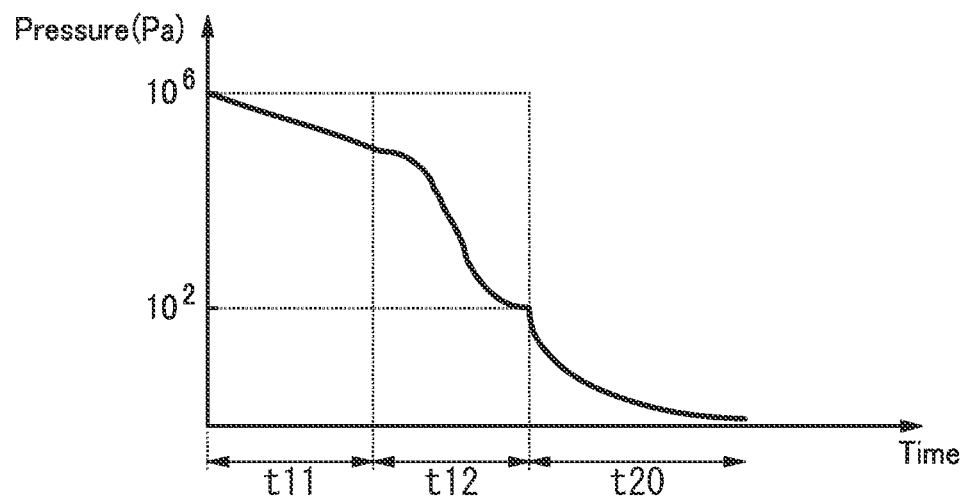
FIG. 10 is a timing diagram showing how pressure in an internal space changes with time in the method for manufacturing the glass panel unit.

As shown in FIG. 10, the evacuation step may be roughly divided into a low vacuum forming step to be performed by the low-vacuum pump 910 (which is a step designated by the reference signs t11 and t12 and which will be hereinafter simply designated by t11, t12) and a high vacuum forming step to be performed by the high-vacuum pump 930 (which is a step designated by the reference sign t20 and which will be hereinafter simply designated by t20). The low vacuum forming step is performed first, which is followed by the high vacuum forming step.

The low vacuum forming step is further subdivided into a first evacuation step t11 to be performed first and a second evacuation step t12 to be performed next to the first evacuation step t11.

In the first evacuation step t11, the gas is allowed to flow with the total channel area of the parallel channels 960 set at a first total channel area. Specifically, in the first evacuation step t11, the first valve 921 is opened to allow the gas to flow through the first channel 961 and the second valve 922 is closed to shut off the gas through the second channel 962 (see FIG. 9A).

In the second evacuation step t12, the gas is allowed to flow with the total channel area of the parallel channels 960 set at a second total channel area which is larger than the first total channel area. Specifically, in the second evacuation step t12, the first valve 921 is closed to shut off the gas through the first channel 961 and the second valve 922 is opened to allow the gas to flow through the second channel 962 (see FIG. 9A). Note that the high-vacuum valve 940 is closed.

Since the first channel area of the first channel 961 is smaller than the second channel area of the second channel 962, the suction power applied from the exhaust port 700 is less in the first evacuation step t11 to be performed first than in the second evacuation step t12. Thus, when the gas is exhausted from the internal space 500 through the exhaust port 700, the air flowing from the vicinity of the exhaust port 700 of the internal space 500 toward the exhaust port 700 may have a lower flow velocity. Specifically, the air flowing from the vicinity of the exhaust port 700 of the internal space 500 toward the exhaust port 700 may have a lower flow velocity than in a situation where the gas is exhausted with the first valve 921 closed and the second valve 922 opened in the first evacuation step t11. This reduces the chances of the pillars 70 which are not firmly clamped between the first panel 20 and the second panel 30 being displaced by the air flowing toward the exhaust port 700.

When the gas has been exhausted to a certain degree from the internal space 500 in the first evacuation step t11, the first evacuation step t11 will be ended and the second variation step t12 will be started instead.

In the first embodiment, the first evacuation step t11 may be performed for one minute and the second evacuation step t12 may also be performed for one minute. However, this duration is only an example and should not be construed as limiting.

This allows a predetermined degree of vacuum to be achieved in a short time with the displacement of the pillars 70 by the air flowing toward the exhaust port 700 reduced.

Figure 11:
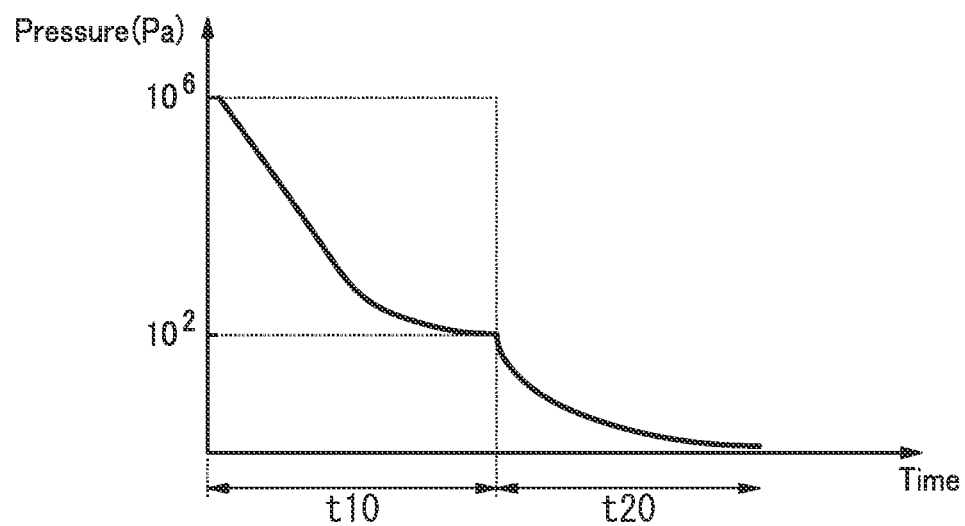
FIG. 11 is a timing diagram showing how pressure in an internal space changes with time in a comparative example.

For your reference, FIG. 11 shows how the pressure varies with time in a situation where the low vacuum forming step (which is a step designated by t10 and will be hereinafter simply designated by t10) is performed with the second valve 922 opened and the first valve 921 closed. In that case, the duration of the low vacuum forming step t10 may be as short as less than two minutes but the pillars 70 tend to be displaced by the air flowing toward the exhaust port 700.

After the low vacuum forming step has been performed, a high vacuum forming step t20 is performed with the first valve 921 and the second valve 922 closed and with the high-vacuum valve 940 opened.

The evacuation step is subdivided into a first temperature lowering step, a second temperature maintaining step, a second temperature raising step, a third temperature maintaining step, and a second temperature lowering step according to temperature variations.

The first temperature lowering step of the evacuation step partially overlaps with the first temperature lowering step of the bonding step preceding the evacuation step. That is to say, in the middle of the first temperature lowering step of the bonding step, the evacuation step is started. In particular, the evacuation step is suitably started when the temperature of the assembly 100 is equal to or higher than the softening point of the hot glue. Alternatively, the evacuation step may begin during the next second temperature maintaining step, not during the first temperature lowering step.

The second temperature maintaining step is the process step performed for the time period t4 shown in FIG. 8 and including maintaining the temperature in the melting furnace at an exhaustion temperature Te. The second temperature maintaining step includes exhausting a gas from the first space 510 via the air passage 600, the second space 520, and the exhaust port 700.

The exhaustion temperature Te is set at a temperature higher than the getter activation temperature (of 350° C., for example) of the gas adsorbent 60 but lower than the first softening point and the second softening point (of 434° C.). For example, the exhaustion temperature Te may be 390° C.

This prevents the frame member 410 and the partition 420 from being deformed. In addition, this activates the getter of the gas adsorbent 60, thus causing the molecules (gas) adsorbed into the getter to be released from the getter. Then, the molecules (i.e., the gas) released from the getter are exhausted via the first space 510, the air passage 600, the second space 520, and the exhaust port 700. Thus, the evacuation step allows the gas adsorbent 60 to recover its adsorption ability.

The exhaustion time t4 is set to create an evacuated space 50 with a desired degree of vacuum (e.g., a degree of vacuum of 0.1 Pa or less). The exhaustion time t4 may be set at 120 minutes, for example. Note that the degree of vacuum of the evacuated space 50 is not particularly limited.

The second temperature raising step, the third temperature maintaining step, and the second temperature lowering step following the second temperature maintaining step overlap with the sealing step following the second temperature maintaining step. That is to say, in the second temperature raising step, the third temperature maintaining step, and the second temperature lowering step, the evacuation step and the sealing step are performed in parallel.

Next, the sealing step (second melting step) is performed. The sealing step includes creating a hermetically sealed evacuated space 50 by closing the exhaust port 700 and sealing the internal space 500 while maintaining the reduced pressure in the internal space 500.

The second temperature raising step is the process step performed for the time period t5 shown in FIG. 8 and including raising the temperature in the melting furnace from the exhaustion temperature Te to a predetermined temperature (second melting temperature) Tm2.

The third temperature maintaining step is the process step performed for the time period t6 shown in FIG. 8 and including maintaining the temperature in the melting furnace at the second melting temperature Tm2.

The third temperature maintaining step includes melting the second hot glue once at a predetermined temperature Tm2 equal to or higher than the second softening point to deform the partition 420 and thereby form a boundary wall 42 closing the air passage 600. Specifically, the first panel 20 and the second panel 30 are heated at the second melting temperature Tm2 for a predetermined amount of time (second melting time) t6 in the melting furnace.

The partition 420 contains the second hot glue. Thus, melting the second hot glue once at the predetermined temperature (second melting temperature) Tm2 that is equal to or higher than the second softening point allows the partition 420 to be deformed into the boundary wall 42 shown in FIGS. 1 and 2. Note that the first melting temperature Tm1 is set at a temperature lower than the second melting temperature Tm2. This prevents, when the first panel 20 and the second panel 30 are bonded together with the frame member 410, the partition 420 from being deformed to close the air passage 600.

The second melting temperature Tm2 and the second melting time t6 are set such that the second hot glue softens to form the boundary wall 42 that closes the air passage 600. The lower limit of the second melting temperature Tm2 is the second softening point (of 434° C.). Nevertheless, the sealing step is performed for the purpose of deforming the partition 420 unlike the bonding step. Thus, the second melting temperature Tm2 is set at a temperature higher than the first melting temperature (of 440° C.) Tm1. The second melting temperature Tm2 may be set at 460° C., for example. Also, the second melting time t6 may be 30 minutes, for example.

The second temperature lowering step is the process step performed for the time period t7 shown in FIG. 8 and includes lowering the temperature in the melting furnace from the second melting temperature Tm2 to ordinary temperature.

After the second temperature lowering step has been performed, the glass panel unit 10 will be unloaded from the melting furnace.

The glass panel unit 10 thus obtained includes the first panel 20, the second panel 30, the seal 40, the evacuated space 50, the second space 520, the gas adsorbent 60, the plurality of pillars 70, and the closing member 80 as shown in FIG. 2.

The evacuated space 50 is formed by exhausting a gas from the first space 510 via the second space 520 and the exhaust port 700 as described above. In other words, the evacuated space 50 is the first space 510, of which the degree of pressure reduction is equal to or less than a predetermined value. The predetermined value may be 0.1 Pa, for example. The evacuated space 50 is hermetically closed completely by the first panel 20, the second panel 30, and the seal 40, and therefore, is separated from the second space 520 and the exhaust port 700.

The seal 40 not only surrounds the evacuated space 50 entirely but also hermetically bonds the first panel 20 and the second panel 30 together. The seal 40 has the shape of a frame including a first part 41 and a second part (boundary wall 42). The first part 41 is a portion, corresponding to the evacuated space 50, of the frame member 410. That is to say, the first part 41 is a portion, facing the evacuated space 50, of the frame member 410. The second part is the boundary wall 42 obtained by deforming the partition 420.

Figure 9B:
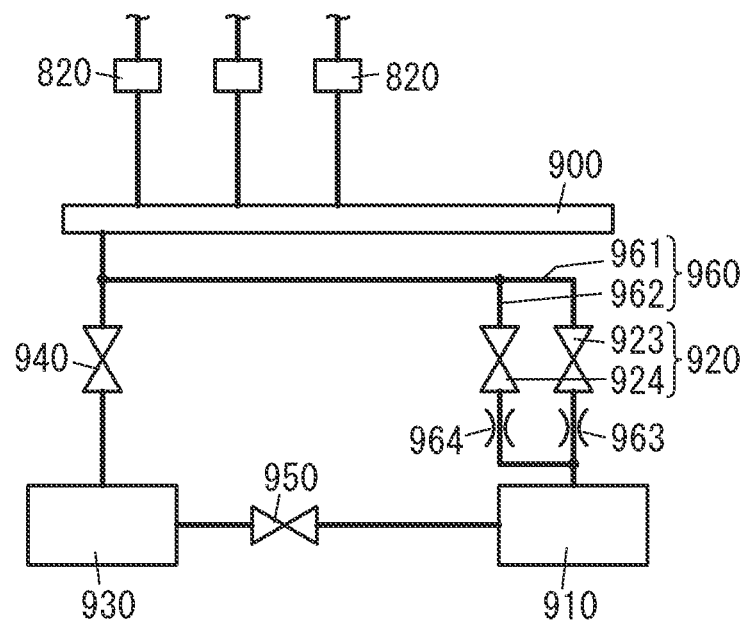
FIG. 9B illustrates another exemplary exhaust system for use in the method for manufacturing the glass panel unit.

FIG. 9B illustrates another exemplary exhaust system according to the first embodiment. In this example, the first channel 961 includes a throttle valve 963 having the first channel area and a first valve 923 for selectively allowing the gas to flow, or shutting off the gas, through the first channel 961. The channel area of the rest of the first channel 961 (including the first valve 923) other than the throttle valve 963 is larger than the first channel area. The second channel 962 includes a throttle valve 964 having the second channel area and a second valve 924 for selectively allowing the gas to flow, or shutting off the gas, through the second channel 962. The channel area of the rest of the second channel 962 (including the second valve 924) other than the throttle valve 964 is larger than the second channel area. This alternative exhaust system shown in FIG. 9B may also achieve the same advantages as the exhaust system shown in FIG. 9A.

Figure 12:
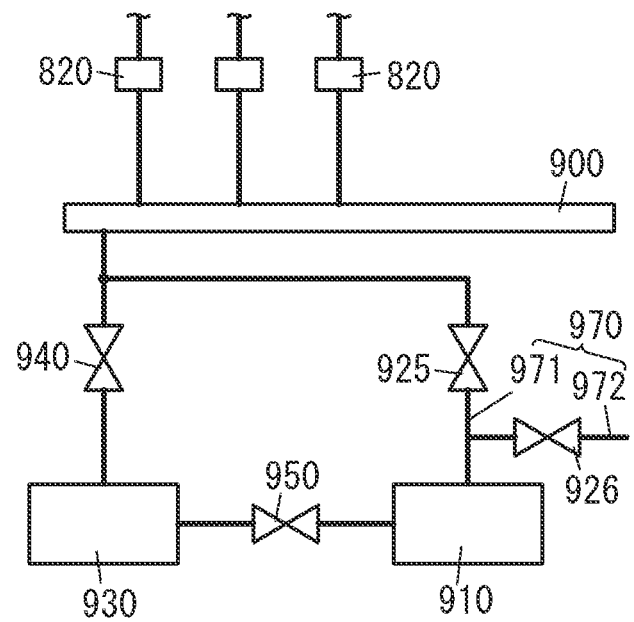
FIG. 12 illustrates an exemplary exhaust system for use in a method for manufacturing a glass panel unit according to a second embodiment.

Next, a method for manufacturing a glass panel unit 10 according to a second embodiment will be described with reference to FIG. 12. The method for manufacturing the glass panel unit 10 according to the second embodiment is mostly the same as the method for manufacturing the glass panel unit 10 according to the first embodiment. Thus, in the following description, their common features will not be described all over again to avoid redundancies.

In the first embodiment described above, the gas in the internal space 500 is exhausted through the parallel channels 960 in the evacuation step as shown in FIGS. 9A and 9B. In the second embodiment, on the other hand, the gas in the internal space 500 is exhausted in the evacuation step by a pump (low-vacuum pump 910) for suctioning the gas with predetermined suction power via predetermined channels 970 as shown in FIG. 12.

The predetermined channels 970 include: an exhaust channel 971 which is located on a path connecting the low-vacuum pump 910 to the exhaust port 700 and which has an exhaust on-off valve 925; and an air-introducing channel 972 which is located on a path connecting the low-vacuum pump 910 to the air and which has an air-introducing on-off valve 926.

The evacuation step includes: a first evacuation step to be performed first; and a second evacuation step to be performed next to the first evacuation step.

In the first evacuation step, the exhaust on-off valve 925 is opened and the air-introducing on-off valve 926 is also opened. In this case, settings are made such that even when the exhaust on-off valve 925 is opened and the air-introducing on-off valve 926 is also opened, the air introduced through the air-introducing channel 972 does not flow toward the exhaust port 700 but flows toward the low-vacuum pump 910.

In the second evacuation step, the exhaust on-off valve 925 is opened and the air-introducing on-off valve 926 is closed.

In the second embodiment, the pressure in the internal space also varies with time in the same way as in FIG. 10 showing how the pressure in the internal space varies with time in the first embodiment.

As shown in FIG. 10, in the first evacuation step t11, the suction power applied from the exhaust port 700 is less than in the second evacuation step t12. That is to say, in the first evacuation step t11, the air-introducing on-off valve 926 is also opened so that the air is introduced through the air-introducing channel 972 and suctioned into the low-vacuum pump 910. This decreases, compared to a situation where the air-introducing on-off valve 926 is closed, the suction power applied by the low-vacuum pump 910 for suctioning the gas from the exhaust port 700 and also decreases the flow velocity of the air flowing from the vicinity of the exhaust port 700 of the internal space 500 toward the exhaust port 700. This reduces the chances of the pillars 70 which are not firmly clamped between the first panel 20 and the second panel 30 being displaced by the air flowing toward the exhaust port 700.

Figure 13:
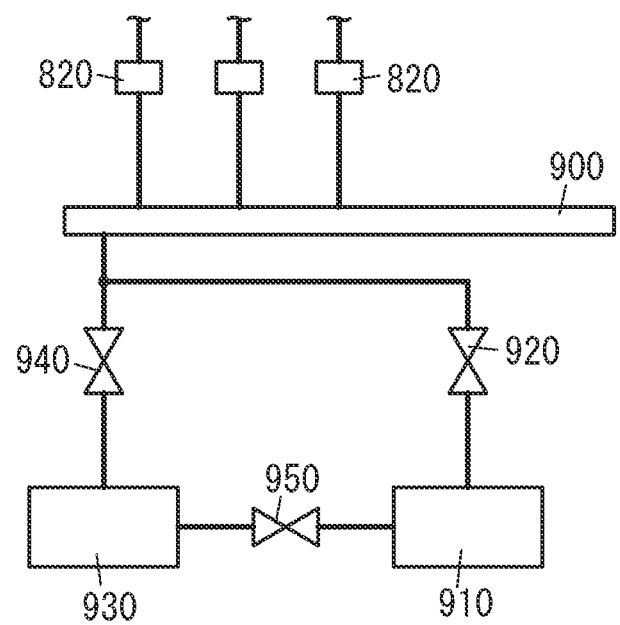
FIG. 13 illustrates an exemplary exhaust system for use in a method for manufacturing a glass panel unit according to a third embodiment.

Next, a method for manufacturing a glass panel unit 10 according to a third embodiment will be described with reference to FIGS. 13 and 14. The method for manufacturing the glass panel unit 10 according to the third embodiment is mostly the same as the method for manufacturing the glass panel unit 10 according to the first embodiment. Thus, in the following description, their common features will not be described all over again to avoid redundancies.

In the first embodiment described above, the low-vacuum valves 920 include the first valve 921 and the second valve 922 as shown in FIG. 9A. In the third embodiment, on the other hand, only one low-vacuum valve 920 is provided. The low-vacuum valve 920 according to the third embodiment, as well as the second valve 922 according to the first embodiment, has the second channel area.

Figure 14:
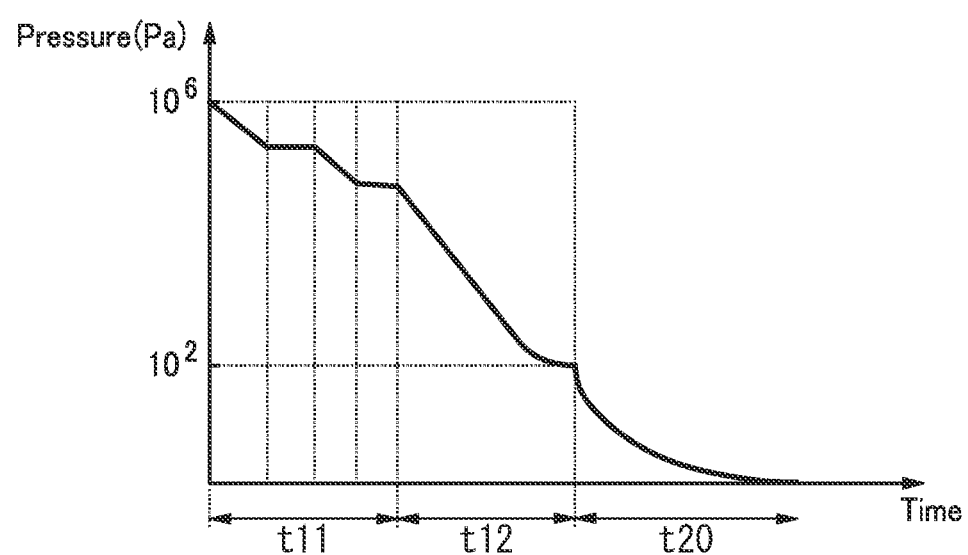
FIG. 14 is a timing diagram showing how pressure in an internal space changes with time in the method for manufacturing the glass panel unit.

As shown in FIG. 14, in the first evacuation step t11 and the second evacuation step t12, the low-vacuum valve 920 has its opened and closed states controlled (subjected to duty control).

A first ratio of a valve open duration of the low-vacuum valve 920 during the first evacuation step t11 to an overall running time of the first evacuation step t11 is smaller than a second ratio of a valve open duration of the low-vacuum valve 920 during the second evacuation step t12 to an overall running time of the second evacuation step t12.

Specifically, in the first evacuation step t11, the low-vacuum valve 920 may be opened for 0.1 seconds, closed for 0.9 seconds next, and then this cycle is repeated at regular time intervals of 5 seconds, 10 seconds, or 1 minute, for example. In that case, the first ratio becomes 0.1.

Throughout the second evacuation step t12, the low-vacuum valve 920 is opened. In that case, the second ratio becomes 1.0.

Note that the valve open duration and valve closed duration of the low-vacuum valve 920 and the first and second ratios are not limited to any particular values.

According to the third embodiment, in the first evacuation step t11 to be performed first, the suction power applied from the exhaust port 700 is less than in the second evacuation step t12. This decreases the flow velocity of the air flowing from the vicinity of the exhaust port 700 of the internal space 500 toward the exhaust port 700 while the gas is being exhausted from the internal space 500 through the exhaust port 700. This reduces the chances of the pillars 70 which are not firmly clamped between the first panel 20 and the second panel 30 being displaced by the air flowing toward the exhaust port 700.

This allows a predetermined degree of vacuum to be achieved in a short time with the displacement of the pillars 70 by the air flowing toward the exhaust port 700 reduced.

Next, a method for manufacturing a glass panel unit 10 according to a fourth embodiment will be described with reference to FIG. 15. The method for manufacturing the glass panel unit 10 according to the fourth embodiment is mostly the same as the method for manufacturing the glass panel unit 10 according to the first embodiment. Thus, in the following description, their common features will not be described all over again to avoid redundancies.

In the fourth embodiment, the gas is exhausted in the same way as shown in FIG. 11 with the second valve 922 opened throughout the low vacuum forming step t10.

At this time, the exhaust path is specially designed to reduce the chances of the pillars 70 which are not firmly clamped between the first panel 20 and the second panel 30 being displaced by the air flowing toward the exhaust port 700.

Figure 15A:
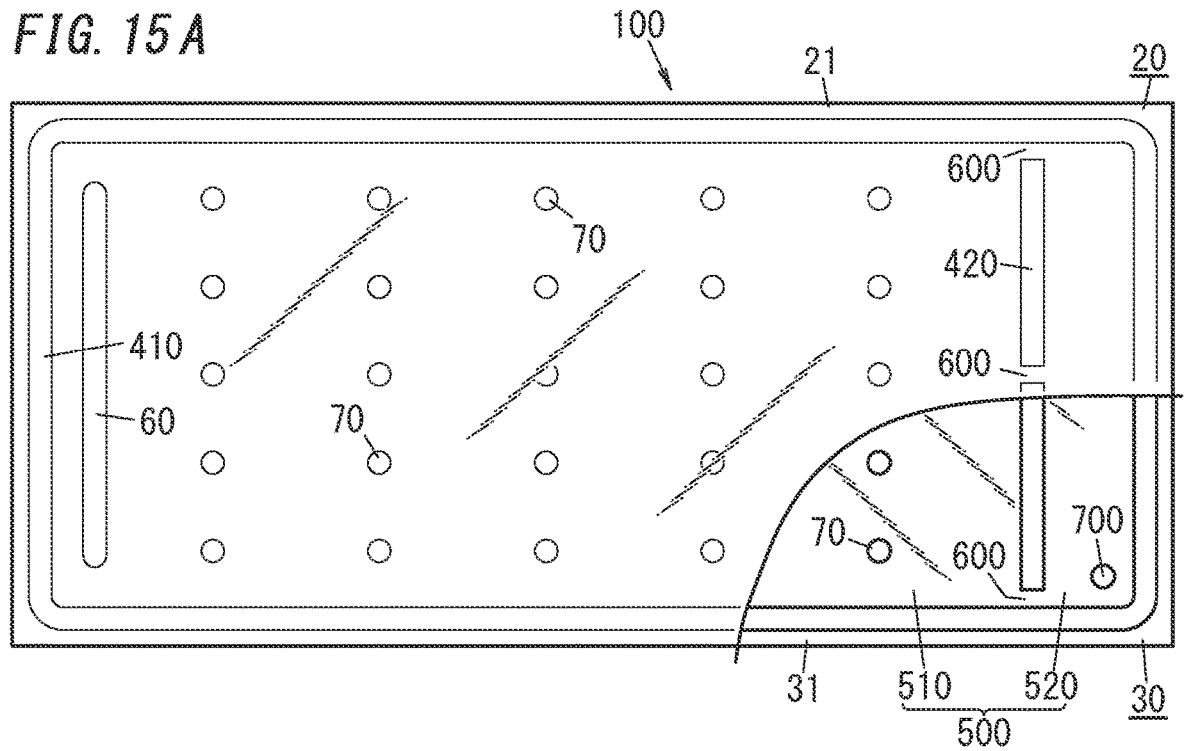
FIG. 15A is a partially cutaway, schematic plan view of an assembly according to a fourth embodiment.

Specifically, as shown in FIG. 15A, the partition 420 is formed along almost the entire width of the assembly 100 and air passages 600 are provided at multiple positions along the length of the partition 420. This increases the total volume of the air passing through the respective air passage 600, thus decreasing the flow velocity of the air colliding against the pillars 70 in the vicinity of the air passage 600 while passing through the air passage 600. This reduces the chances of the pillars 70 which are not firmly clamped between the first panel 20 and the second panel 30 being displaced by the air flowing toward the exhaust port 700.

Figure 15B:
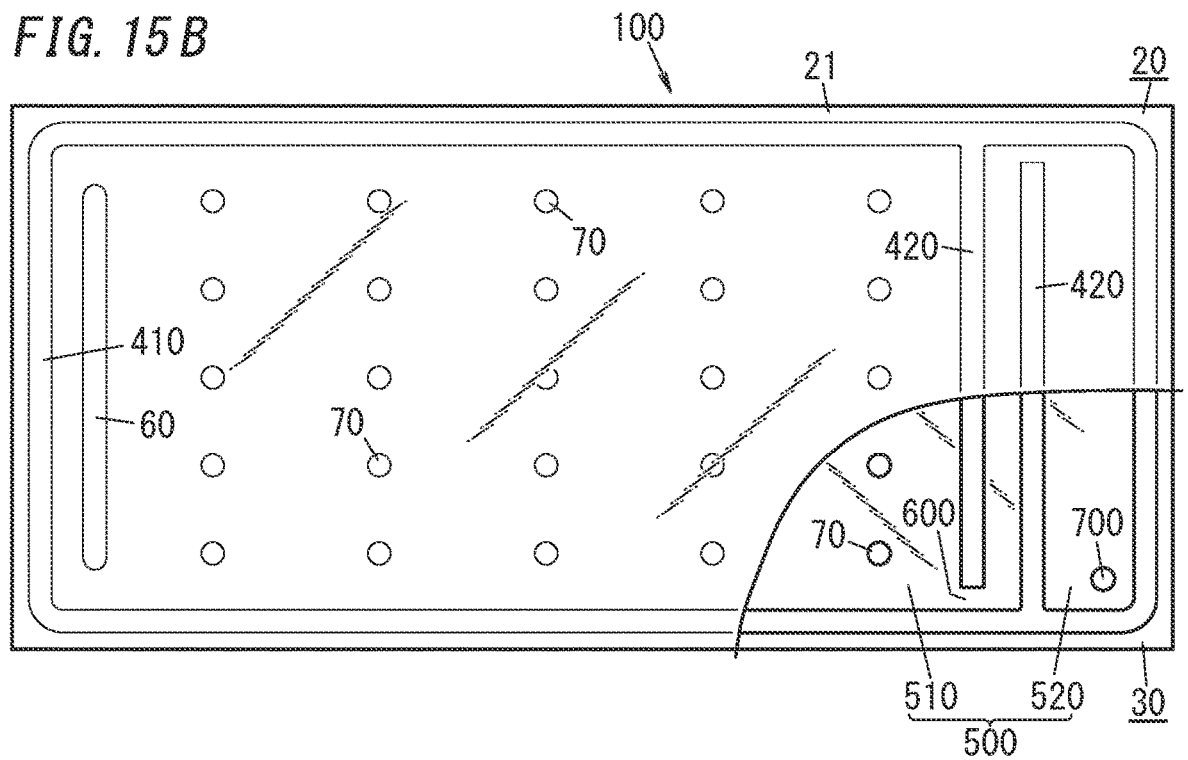
FIG. 15B is a partially cutaway, schematic plan view of an assembly according to another example of the fourth embodiment.

In addition, as shown in FIG. 15B, the exhaust path running from the air passage 600 between the partition 420 and the frame member 410 through the exhaust port 700 is extended. In this fourth embodiment, the exhaust path running from the air passage 600 through the exhaust port 700 is extended by providing an additional partition 420. Thus, the extended exhaust path increases the drag against the air flowing through the exhaust path and decreases the flow velocity of the air passing through the respective air passages 600. This reduces the chances of the pillars 70 which are not firmly clamped between the first panel 20 and the second panel 30 being displaced by the air flowing toward the exhaust port 700.

Next, variations of the first to fourth embodiments will be described.

In the embodiments described above, the glass panel unit 10 has a rectangular shape. However, this is only an example and should not be construed as limiting. Alternatively, the glass panel unit 10 may also have a circular, polygonal, or any other desired shape. That is to say, the first panel 20, the second panel 30, and the seal 40 do not have to be rectangular but may also have a circular, polygonal, or any other desired shape. In addition, the respective shapes of the first panel 20, the second panel 30, the frame member 410, and the boundary wall 42 do not have to be the ones used in the embodiment described above, but may also be any other shapes that allow a glass panel unit 10 of a desired shape to be obtained. Note that the shape and dimensions of the glass panel unit 10 may be determined according to the intended use of the glass panel unit 10.

Neither the first surface nor second surface of the first glass pane 21 of the first panel 20 has to be a plane. Likewise, neither the first surface nor second surface of the second glass pane 31 of the second panel 30 has to be a plane.

The first glass pane 21 of the first panel 20 and the second glass pane 31 of the second panel 30 do not have to have the same planar shape and planar dimensions. The first glass pane 21 and the second glass pane 31 do not have to have the same thickness, either. In addition, the first glass pane 21 and the second glass pane 31 do not have to be made of the same material, either.

The seal 40 does not have to have the same planar shape as the first panel 20 and the second panel 30. Likewise, the frame member 410 does not have to have the same planar shape as the first panel 20 and the second panel 30, either.

Optionally, the first panel 20 may include a coating having desired physical properties and formed on the second surface of the first glass pane 21. Alternatively, the first panel 20 may have no coatings 22. That is to say, the first panel 20 may consist of the first glass pane 21 alone.

Furthermore, the second panel 30 may include a coating with desired physical properties. The coating may include at least one of thin films respectively formed on the first and second surfaces of the second glass pane 31, for example. The coating may be an infrared reflective film or ultraviolet reflective film that reflects light with a particular wavelength, for example.

Furthermore, in the embodiments described above, the frame member 410 is made of the first hot glue. However, this is only an example and should not be construed as limiting. Alternatively, the frame member 410 may include not only the first hot glue but also a core material or any other material as well. That is to say, the frame member 410 needs to include at least the first hot glue. Furthermore, in the embodiments described above, the frame member 410 is formed to cover the second panel 30 almost entirely. However, this is only an example and should not be construed as limiting. Rather the frame member 410 needs to be formed to cover a predetermined area on the second panel 30. That is to say, the frame member 410 does not have to be formed to cover almost the entire area on the second panel 30.

Furthermore, in the embodiments described above, the partition 420 is made of the second hot glue. However, this is only an example and should not be construed as limiting. Alternatively, the partition 420 may include not only the second hot glue but also a core material or any other material as well. That is to say, the partition 420 needs to include at least the second hot glue.

In the embodiments described above, the internal space 500 is partitioned into a single first space 510 and a single second space 520. Optionally, the internal space 500 may also be partitioned into one or more first spaces 510 and one or more second spaces 520.

The first glue and the second hot glue do not have to be glass frit but may also be a low-melting metal or a hot melt adhesive, for example.

In the embodiments described above, a melting furnace is used to heat the frame member 410, the gas adsorbent 60, and the partition 420. However, heating may be conducted by any appropriate heating means. The heating means may be a laser beam or a heat transfer plate connected to a heat source, for example.

In the embodiments described above, the exhaust port 700 is provided through the second panel 30. However, this is only an example and should not be construed as limiting. Alternatively, the exhaust port 700 may be provided through the first glass pane 21 of the first panel 20 or through the frame member 410.

As can be seen from the foregoing description of embodiments, a method for manufacturing a glass panel unit (10) according to a first aspect includes a glue arrangement step, a pillar placement step, an assembly forming step, a bonding step, an evacuation step, and a sealing step.

The glue arrangement step includes arranging a hot glue on either a first panel (20) including a first glass pane (21) or a second panel (30) including a second glass pane (31).

The pillar placement step includes placing pillars (70) on either the first panel (20) or the second panel (30).

The assembly forming step includes forming an assembly (100) including the first panel (20), the second panel (30), the hot glue, and the pillars (70) and having an exhaust port (700) provided through at least one of the first panel (20), the second panel (30), or the hot glue by arranging the second panel (30) such that the second panel (30) faces the first panel (20).

The bonding step includes heating the assembly (100) to melt the hot glue, bonding the first panel (20) and the second panel (30) together with the hot glue thus melted, and thereby forming an internal space (500) surrounded, except the exhaust port (700), with the first panel (20), the second panel (30), and the hot glue melted.

The evacuation step includes reducing pressure in the internal space (500) by evacuation that involves exhausting, with predetermined suction power, a gas from the internal space (500) via parallel channels (960) and the exhaust port (700).

The sealing step includes creating a hermetically sealed evacuated space (50) by closing the exhaust port (700) and sealing the internal space (500) while maintaining a reduced pressure in the internal space (500).

The parallel channels (960) include: a plurality of channels (a first channel (961) and a second channel (962)) that are connected together in parallel; and one or two or more on-off valves (a first valve (921) and a second valve (922)) provided for one or two or more channels out of the plurality of channels. A total channel area of the parallel channels (960) is changeable according to a combination of opened and closed states of the on-off valves.

The evacuation step includes: a first evacuation step to be performed first; and a second evacuation step to be performed next to the first evacuation step.

The first evacuation step includes allowing the gas to flow while setting the total channel area of the parallel channels (960) at a first total channel area.

The second evacuation step includes allowing the gas to flow while setting the total channel area of the parallel channels (960) at a second total channel area that is larger than the first total channel area.

A method for manufacturing a glass panel unit (10) according to the first aspect reduces the chances of the pillars (70) being displaced by the air flowing toward the exhaust port (700).

A method for manufacturing a glass panel unit (10) according to a second aspect includes a glue arrangement step, a pillar placement step, an assembly forming step, a bonding step, an evacuation step, and a sealing step.

The glue arrangement step includes arranging a hot glue on either a first panel (20) including a first glass pane (21) or a second panel (30) including a second glass pane (31).

The pillar placement step includes placing pillars (70) on either the first panel (20) or the second panel (30).

The assembly forming step includes forming an assembly (100) including the first panel (20), the second panel (30), the hot glue, and the pillars (70) and having an exhaust port (700) provided through at least one of the first panel (20), the second panel (30), or the hot glue by arranging the second panel (30) such that the second panel (30) faces the first panel (20).

The bonding step includes heating the assembly (100) to melt the hot glue, bonding the first panel (20) and the second panel (30) together with the hot glue thus melted, and thereby forming an internal space (500) surrounded, except the exhaust port (700), with the first panel (20), the second panel (30), and the hot glue melted.

The evacuation step includes reducing pressure in the internal space (500) by evacuation that involves exhausting a gas, using a pump (low-vacuum pump (910)) configured to suction the gas with predetermined suction power, from the internal space (500) via a predetermined channel (970) and the exhaust port (700).

The sealing step includes creating a hermetically sealed evacuated space (50) by closing the exhaust port (700) and sealing the internal space (500) while maintaining a reduced pressure in the internal space (500).

The predetermined channel includes: an exhaust channel (971) located on a path connecting the pump (low-vacuum pump (910)) to the exhaust port (700) and having an exhaust on-off valve (925); and an air-introducing channel (972) located on a path connecting the pump (low-vacuum pump (910)) to the air and having an air-introducing on-off valve (926).

The evacuation step includes: a first evacuation step to be performed first; and a second evacuation step to be performed next to the first evacuation step.

The first evacuation step includes opening the exhaust on-off valve (925) and opening the air-introducing on-off valve (926).

The second evacuation step includes opening the exhaust on-off valve (925) and closing the air-introducing on-off valve (926).

A method for manufacturing a glass panel unit (10) according to the second aspect reduces the chances of the pillars (70) being displaced by the air flowing toward the exhaust port (700).

A method for manufacturing a glass panel unit (10) according to a third aspect includes a glue arrangement step, a pillar placement step, an assembly forming step, a bonding step, an evacuation step, and a sealing step.

The glue arrangement step includes arranging a hot glue on either a first panel (20) including a first glass pane (21) or a second panel (30) including a second glass pane (31).

The pillar placement step includes placing pillars (70) on either the first panel (20) or the second panel (30).

The assembly forming step includes forming an assembly (100) including the first panel (20), the second panel (30), the hot glue, and the pillars (70) and having an exhaust port (700) provided through at least one of the first panel (20), the second panel (30), or the hot glue by arranging the second panel (30) such that the second panel (30) faces the first panel (20).

The bonding step includes heating the assembly (100) to melt the hot glue, bonding the first panel (20) and the second panel (30) together with the hot glue thus melted, and thereby forming an internal space (500) surrounded, except the exhaust port (700), with the first panel (20), the second panel (30), and the hot glue melted.

The evacuation step includes reducing pressure in the internal space (500) by evacuation that involves exhausting, with predetermined suction power, a gas from the internal space (500) via a valve (low-vacuum valve (920)) and the exhaust port (700).

The sealing step includes creating a hermetically sealed evacuated space (50) by closing the exhaust port (700) and sealing the internal space (500) while maintaining a reduced pressure in the internal space (500).

The evacuation step includes: a first evacuation step to be performed first; and a second evacuation step to be performed next to the first evacuation step. The first evacuation step and the second evacuation step each include controlling opened and closed states of the valve.

A first ratio of a valve open duration during the first evacuation step to an overall running time of the first evacuation step is smaller than a second ratio of a valve open duration during the second evacuation step to an overall running time of the second evacuation step. The valve open duration is a period of time for which the valve is opened.

A method for manufacturing a glass panel unit (10) according to the third aspect reduces the chances of the pillars (70) being displaced by the air flowing toward the exhaust port (700).

REFERENCE SIGNS LIST

10 Glass Panel Unit
20 First Panel
21 First Glass Pane
30 Second Panel
31 Second Glass Pane
50 Evacuated Space
70 Pillar
100 Assembly
500 Internal Space
700 Exhaust Port

The invention claimed is:

1. A method for manufacturing a glass panel unit, the method comprising:
    a glue arrangement step including arranging a hot glue on either a first panel or a second panel, the first panel including a first glass pane, the second panel including a second glass pane;
    a pillar placement step including placing pillars on either the first panel or the second panel;
    an assembly forming step including forming an assembly including the first panel, the second panel, the hot glue, and the pillars and having an exhaust port provided through at least one of the first panel, the second panel, or the hot glue by arranging the second panel such that the second panel faces the first panel;
    a bonding step including heating the assembly to melt the hot glue, bonding the first panel and the second panel together with the hot glue thus melted, and thereby forming an internal space surrounded, except the exhaust port, with the first panel, the second panel, and the hot glue melted;
    an evacuation step including reducing pressure in the internal space by evacuation that involves exhausting by a low-vacuum pump, with predetermined suction power, a gas from the internal space via parallel channels and the exhaust port and exhausting by a high-vacuum pump, with predetermined suction power, a gas from the internal space via a vent pipe having a high-vacuum valve on a way and the exhaust port; and a sealing step including creating a hermetically sealed evacuated space by closing the exhaust port and sealing the internal space while maintaining a reduced pressure in the internal space, the parallel channels including: a plurality of channels that are connected together in parallel; and one or two or more on-off valves provided for one or two or more channels out of the plurality of channels, a total channel area of the parallel channels being changeable according to a combination of opened and closed states of the on-off valves, the evacuation step including: a first evacuation step to be performed first by the low-vacuum pump; a second evacuation step to be performed by the low-vacuum pump next to the first evacuation step; and a high vacuum forming step to be performed by the high-vacuum pump next to the second evacuation step, the first evacuation step including allowing the gas to flow while setting the total channel area of the parallel channels at a first total channel area, the second evacuation step including allowing the gas to flow while setting the total channel area of the parallel channels at a second total channel area that is larger than the first total channel area, and the high vacuum forming step including allowing the gas to flow with the on-off valves closed and with the high-vacuum valve opened.

2. A method for manufacturing a glass panel unit, the method comprising:

a glue arrangement step including arranging a hot glue on either a first panel or a second panel, the first panel including a first glass pane, the second panel including a second glass pane;

a pillar placement step including placing pillars on either the first panel or the second panel;

an assembly forming step including forming an assembly including the first panel, the second panel, the hot glue, and the pillars and having an exhaust port provided through at least one of the first panel, the second panel, or the hot glue by arranging the second panel such that the second panel faces the first panel;

a bonding step including heating the assembly to melt the hot glue, bonding the first panel and the second panel together with the hot glue thus melted, and thereby forming an internal space surrounded, except the exhaust port, with the first panel, the second panel, and the hot glue melted;

an evacuation step including reducing pressure in the internal space by evacuation that involves exhausting a gas, using a pump configured to suction the gas with predetermined suction power, from the internal space via a predetermined channel and the exhaust port; and a sealing step including creating a hermetically sealed evacuated space by closing the exhaust port and sealing the internal space while maintaining a reduced pressure in the internal space, the predetermined channel including: an exhaust channel located on a path connecting the pump to the exhaust port and having an exhaust on-off valve; and an air-introducing channel located on a path connecting the pump to the air and having an air-introducing on-off valve, the evacuation step including: a first evacuation step to be performed first; and a second evacuation step to be performed next to the first evacuation step, the first evacuation step including opening the exhaust on-off valve and opening the air-introducing on-off valve, the second evacuation step including maintaining the exhaust on-off valve open and closing the air-introducing on-off valve.

3. A method for manufacturing a glass panel unit, the method comprising:

a glue arrangement step including arranging a hot glue on either a first panel or a second panel, the first panel including a first glass pane, the second panel including a second glass pane;

a pillar placement step including placing pillars on either the first panel or the second panel;

an assembly forming step including forming an assembly including the first panel, the second panel, the hot glue, and the pillars and having an exhaust port provided through at least one of the first panel, the second panel, or the hot glue by arranging the second panel such that the second panel faces the first panel;

a bonding step including heating the assembly to melt the hot glue, bonding the first panel and the second panel together with the hot glue thus melted, and thereby forming an internal space surrounded, except the exhaust port, with the first panel, the second panel, and the hot glue melted;

an evacuation step including reducing pressure in the internal space by evacuation that involves exhausting by a low-vacuum pump, with predetermined suction power, a gas from the internal space via a low-vacuum valve and the exhaust port and exhausting by a high-vacuum pump, with predetermined suction power, a gas from the internal space via a high-vacuum valve and the exhaust port; and a sealing step including creating a hermetically sealed evacuated space by closing the exhaust port and sealing the internal space while maintaining a reduced pressure in the internal space, the evacuation step including: a first evacuation step to be performed first; and a second evacuation step to be performed next to the first evacuation step, the first evacuation step and the second evacuation step each including controlling opened and closed states of the low-vacuum valve, a first ratio of a low-vacuum valve open duration during the first evacuation step to an overall running time of the first evacuation step being smaller than a second ratio of a low-vacuum valve open duration during the second evacuation step to an overall running time of the second evacuation step, the low-vacuum valve open duration being a period of time for which the low-vacuum valve is opened.

4. A method for manufacturing a glass panel unit, the method comprising:

a glue arrangement step including arranging a hot glue on either a first panel or a second panel, the first panel including a first glass pane, the second panel including a second glass pane;

a pillar placement step including placing pillars on either the first panel or the second panel;

an assembly forming step including forming an assembly including the first panel, the second panel, the hot glue, and the pillars and having an exhaust port provided through at least one of the first panel, the second panel, or the hot glue by arranging the second panel such that the second panel faces the first panel;

a bonding step including heating the assembly to melt the hot glue, bonding the first panel and the second panel together with the hot glue thus melted, and thereby forming an internal space surrounded, except the exhaust port, with the first panel, the second panel, and the hot glue melted;

an evacuation step including reducing pressure in the internal space by evacuation that involves:
 exhausting by a low-vacuum pump, with predetermined suction power, a gas from the internal space via a low-vacuum valve and the exhaust port; and
 exhausting by a high-vacuum pump, with predetermined suction power, a gas from the internal space via a high-vacuum valve and the exhaust port; and a sealing step including creating a hermetically sealed evacuated space by closing the exhaust port and sealing the internal space while maintaining a reduced pressure in the internal space, the evacuation step including: a first evacuation step to be performed first; and a second evacuation step to be performed after the first evacuation step, the first evacuation step including controlling the low-vacuum valve such that the low-vacuum valve is opened and closed multiple times, the second evacuation step including keeping the low-vacuum valve in the opened state.

* * * * *